US011472895B2

United States Patent
Hendriksen et al.

(10) Patent No.: US 11,472,895 B2
(45) Date of Patent: Oct. 18, 2022

(54) SUBSTITUTED BIS-2-INDENYL METALLOCENE COMPOUNDS

(71) Applicant: SABIC GLOBAL TECHNOLOGIES B.V., Bergen op Zoom (NL)

(72) Inventors: Coen Hendriksen, Geleen (NL); Nicolaas Hendrika Friederichs, Geleen (NL); Jaiprakash Brijlal Sainani, Geleen (NL); Anamitra Chatterjee, Geleen (NL); Vyatcheslav Izmer, Geleen (NL); Dmitry Kononovich, Geleen (NL); Alexander Voskoboynikov, Geleen (NL); Vincenzo Busico, Geleen (NL); Roberta Cipullo, Geleen (NL); Antonio Vittoria, Geleen (NL); Oleg V. Samsonov, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/267,663

(22) PCT Filed: Aug. 29, 2019

(86) PCT No.: PCT/EP2019/073068
§ 371 (c)(1),
(2) Date: Feb. 10, 2021

(87) PCT Pub. No.: WO2020/043815
PCT Pub. Date: Mar. 5, 2020

(65) Prior Publication Data
US 2021/0253749 A1  Aug. 19, 2021

(30) Foreign Application Priority Data

Aug. 30, 2018 (EP) .................................... 18191633

(51) Int. Cl.
| C08F 210/16 | (2006.01) |
| C08F 4/6592 | (2006.01) |
| C08F 4/659 | (2006.01) |

(52) U.S. Cl.
CPC ...... *C08F 4/65927* (2013.01); *C08F 4/65916* (2013.01); *C08F 210/16* (2013.01)

(58) Field of Classification Search
CPC ....... C07F 17/00; C08F 4/65927; C08F 10/00
See application file for complete search history.

(56) References Cited

FOREIGN PATENT DOCUMENTS

| EP | 1059299 A1 | 12/2000 |
| WO | 2014139949 A1 | 9/2014 |
| WO | 2016188999 A1 | 12/2016 |
| WO | 2017118617 A1 | 7/2017 |

OTHER PUBLICATIONS

International Search Report for International Application No. PCT/EP2019/073068, International Filing Date Aug. 29, 2019, dated Oct. 4, 2019, 6 pages.
Morton et al., "1, 1-Olefin-bridged bis-(2-indenyl) metallocenes of titanium and zirconium" Dalton Transcations, vol. 13, No. 35, Jul. 29, 2014, pp. 13219-13231.
Written Opinion for International Application No. PCT/EP2019/073068, International Filing Date Aug. 29, 2019, dated Oct. 4, 2019, 6 pages.

*Primary Examiner* — Caixia Lu
(74) *Attorney, Agent, or Firm* — Cantor Colburn LLP

(57) ABSTRACT

The present invention provides a compound according to formula (I): (I) wherein: •R2 is a bridging moiety containing at least one sp2 hybridised carbon atom; •each R4, R4', R7 and R7' are hydrogen or moieties comprising 1-10 carbon atoms, wherein each R4, R4', R7 and R7' are the same; •each R5, R5', R6 and R6' are moieties comprising 1-10 carbon atoms, wherein each R5, R5', R6 and R6' are the same; and •Z is a moiety selected from $ZrX_2$, $HfX_2$, or $TiX_2$, wherein X is selected from the group of halogens, alkyls, aryls and aralkyls. Such compound allows for the preparation of catalyst systems that provide improved olefin reactivity, such as ethylene reactivity, increased molecular weight in olefin polymerisation, such as increased $M_w$ in ethylene polymerisation, and increased comonomer incorporation in copolymerisation reactions of olefins, such as in copolymerisation reactions of ethylene with 1-hexene.

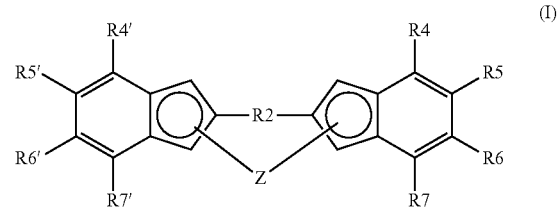

17 Claims, No Drawings

SUBSTITUTED BIS-2-INDENYL METALLOCENE COMPOUNDS

CROSS REFERENCE TO RELATED APPLICATIONS

This application is a National Stage application of PCT/EP2019/073068, filed Aug. 29, 2019, which claims the benefit of European Application No. 18191633.9, filed Aug. 30, 2018, both of which are incorporated by reference in their entirety herein.

BACKGROUND

The present invention relates to substituted bis-2-indenyl compounds. The invention also relates to catalyst systems comprising such substituted bis-2-indenyl compounds. The invention further relates to a process for production of olefin-based polymers using such catalyst system, and to ethylene-based polymers produced using such catalyst system.

Bis-indenyl-based compounds are commonly used compounds in the synthesis of catalysts, in particular in the synthesis of catalysts of the metallocene type. Such catalysts find their application in for example the production of olefin-based polymers, examples of which include ethylene-based polymers, propylene-based polymers, and ethylene-propylene-diene elastomers.

It is well understood that the nature and structure of catalysts that are employed in polymerisation reactions can have significant effects on the conditions of the polymerisation reactions as well as on the properties of the polymers that are produced in those reactions. For that reason, there is extensive and ongoing research being conducted to develop catalysts, and compounds that can be employed in the production of such catalysts, which beneficially affect both the polymerisation process as well as the properties of the produced polymers.

For example in the field of polymerisation of ethylene or propylene, in particular in the field of polymerisation of ethylene, process and product parameters that can be significantly affected by the choice of catalyst include the reactivity of the monomers, the ability to incorporate certain comonomers in the polymeric structure, and the ability to produce polymers having a certain desirable molecular weight, such as the weight average molecular weight, amongst others.

Bis-2-indenyl-based metallocenes are used the polymerisation of olefins such as ethylene or propylene. For example, EP1059299A1 presents the preparation of [2,2'-bis(2-indenyl)biphenyl]zirconium dichloride, a catalyst of the metallocene type. Further, WO2016/188999A1 presents [2,2'-bis (4,7-dimethyl-2-indenyl)biphenyl]zirconium dichloride, a catalyst of the metallocene type. These catalysts have been attempted for use in polymerisation of ethylene, however there remains a desire to further improve the process and product properties are listed above.

Further, WO2017118617 presents 2,2'-bridged biphenylene bis-2-indenyl metallocenes with advantageous performance. However, the 2-indenyl moieties in the ligands used in the metallocenes according to WO2017118617 are not symmetrical, which can cause the formation of different isomeric structures of the metallocene in the synthesis as is indeed obvious from the presented examples. Different isomeric structures of metallocenes can translate in different catalytic performance, which subsequently causes the formation of a mixture of polymers. The latter in turn can lead to sub-optimal product properties. To avoid this, elaborate purification steps are needed in the ligand and/or metallocene synthesis.

The production costs for metallocene compounds are highly affected by the synthetic complexity of the organic ligands for the metallocene compounds. Especially for bridged metallocenes, it is therefore advantageous that the two ligands that are connected by the bridging moiety are identical and symmetrical.

SUMMARY

The present invention provides a compound according to formula I:

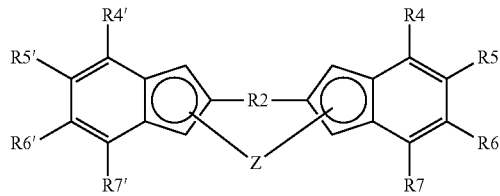

formula I
wherein:
R2 is a bridging moiety containing at least one sp2 hybridised carbon atom;
each R4, R4', R7 and R7' are hydrogen or moieties comprising 1-10 carbon atoms, wherein each R4, R4', R7 and R7' are the same;
each R5, R5', R6 and R6' are moieties comprising 1-10 carbon atoms, wherein each R5, R5', R6 and R6' are the same; and
Z is a moiety selected from $ZrX_2$, $HfX_2$, or $TiX_2$, wherein X is selected from the group of halogens, alkyls, aryls and aralkyls.

Such compound allows for the preparation of catalyst systems that provide improved olefin reactivity, such as ethylene reactivity, increased molecular weight build-up in olefin polymerisation, such as increased $M_w$ in ethylene polymerisation, and increased comonomer incorporation in copolymerisation reactions of olefins, such as in copolymerisation reactions of ethylene with 1-hexene. Furthermore, due to the identical and symmetrical indenyl-type moieties, the synthetic complexity of the ligand is reduced, advantageously contributing to simplification of the synthesis process of the metallocene compounds, thereby positively contributing to the process economics for using these compounds.

DETAILED DESCRIPTION

The compound according to formula I may in the context of the present invention also be referred to as the metallocene compound.

In the compounds of the present invention, each of the two indenyl moieties are bound at the 2-position to a bridging moiety. Further, each of the two indenyl moieties are substituted at the 5 and the 6 position with a moiety comprising 1-10 carbon atoms. In certain embodiments, the moieties at the 5 and the 6 position may connect to form a fused cyclic structure. In certain other embodiments, the indenyl moieties may also be substituted at the 4 and the 7 position with a moiety comprising 1-10 carbon atoms. Such substituting moiety at the 4 position may for example be connected to the substituting moiety at the 5 position to form a fused cyclic structure. Likewise, such substituting moiety at the 7 position may for example be connected to the substituting moiety at the 6 position to form a fused cyclic structure.

For example, the moieties with which the indenyl is substituted at the 5 and the 6 position may together form a ring comprising 5 or 6 carbon atoms. Such ring may for example be a cyclopentane, cyclopentene, cyclohexane or benzene ring. Such ring may itself bear one or more substituents, for example C1-C4 alkyl substituents, preferably methyl substituents.

The bridging moiety R2 may for example be selected from a substituted or unsubstituted methylene, phenyl or biphenyl, preferably R2 is selected from a substituted methylene, 1,2-phenylene or 2,2'-biphenylene moiety. Preferably R2 is selected from a substituted or unsubstituted methylene, 1,2-phenylene or 2,2'-biphenylene moiety. Particularly preferably, R2 is a substituted or unsubstituted 2,2'-biphenylene moiety.

Each moiety R4, R4', R7 and R7' may be selected from hydrogen or moieties comprising 1-10 carbon atoms. Preferably, each R4, R4', R7 and R7' is hydrogen. Alternatively, each R4, R4', R7 and R7' is a moiety comprising 1-10 carbon atoms.

Moiety R4 may together with moiety R5 form a fused or cyclic moiety. Moiety R4' may together with moiety R5' form a fused or cyclic moiety. Moiety R6 may together with moiety R7 form a fused or cyclic moiety. Moiety R6' may together with moiety R7' form a fused or cyclic moiety. Such fused moiety may comprise 1-10 carbon atoms. Preferably, such fused moiety comprises 3-10 carbon atoms. It is preferred that such fused moiety forms a 5-carbon ring or a 6-carbon ring fused with the 6-carbon ring of the indenyl moiety on the 4 and the 5 position and/or on the 6 and the 7 position of the indenyl ring. Such fused ring to the indenyl moiety may itself be substituted, for example may be methyl-substituted.

In a particular embodiment, R4 forms a fused moiety with R5, R4' forms a fused moiety with R5', R6 forms a fused moiety with R7, and R6' forms a fused moiety with R7'. Particularly preferable, each fused moiety of R4 with R5, R4' with R5', R6 with R7 and R6' with R7' are the same. In such embodiment, the substituted indenyl moieties form a symmetrical structure.

R5 and R6 and/or R5' with R6' may be connected to form a fused moiety comprising a ring structure. Preferably, such fused moiety comprises 3-10 carbon atoms. It is preferred that such fused moiety forms a 5-carbon ring or a 6-carbon ring fused with the 6-carbon ring of the indenyl moiety on the 5 and the 6 position of the indenyl ring. Such fused ring to the indenyl moiety may itself be substituted, for example may be methyl-substituted.

Alternatively, each of R5, R5', R6 and R6' may be C1-C4 alkyl moieties. Preferably, each R5, R5', R6 and R6' are methyl moieties.

The fused moieties may each form benzene ring, a cyclohexane ring, a cyclohexene ring, a cyclopentane ring, or a cyclopentene ring. The fused ring atoms may each individually be unsubstituted or substituted with hydrogen or a C1-C4 alkyl moiety, preferably a methyl moiety.

The compound according to formula I may for example be a compound selected from [6,6'-biphenyl-2,2'-diylbis(1,2,3,5-tetrahydro-s-indacenyl)]zirconium dichloride, [2,2'-di-(5,5,8,8-tetramethyl-5,6,7,8-tetrahydro-cyclopenta[b]naphthalene-2-yl)biphenyl]zirconium dichloride, [6,6'-biphenyl-2,2'-diylbis(2,2'-dimethyl-1,2,3,5-tetrahydro-s-indacenyl)]zirconium dichloride, [6,6'-biphenyl-2,2'-diylbis($\eta^5$-2,2,5,5-tetramethyl-2,3,4,5,6,7-hexahydro-cyclopenta[e]as-indacenyl)]zirconium dichloride, [2,2'-biphenyl-2,2'-diylbis-$\eta^5$-cyclopenta[b]naphthalenyl]zirconium dimethyl, [2,2'-di-($\eta^5$-5,6-dimethyl-inden-2-yl)biphenyl]zirconium dichloride, and [6,6'-biphenyl-2,2'-diylbis($\eta^5$-4,8-dimethyl-1,2,3,5-tetrahydro-s-indacenyl)]zirconium dichloride.

The compounds according to the present invention may in certain embodiments of the invention be immobilised on a support, to form a supported metallocene compound. The support is preferably an inert support, more preferably a porous inert support. Such porous inert support may for example be a material selected from talc, clay, or inorganic oxides. Preferably, the porous inert support is a porous inorganic oxide, such as a silica or an alumina. Other inorganic oxides may be employed in combination with such silica or alumina, such as magnesia, titania and zirconia.

Preferably, the support is a silica having a surface area between 200 and 900 $m^2$/g and/or a pore volume of >0.5 and <4.0 ml/g.

Alternatively, the support materials may be polymeric support materials, such as polyvinyl chloride, polystyrene, polyethylene or polypropylene.

In certain embodiments, the invention also relates to a catalyst system comprising the compound or the supported metallocene compound. It is particularly preferred that such catalyst system further comprises a cocatalyst. Such cocatalyst is to function to generate a cationic specie from the compound and to form a so-called non-coordinating or weakly coordinating anion. Such cocatalysts may for example be selected from aluminium- or boron-containing cocatalysts. Such aluminium-containing cocatalysts may for example be selected from aluminoxanes, alkyl aluminium compounds, and aluminium-alkyl-chlorides. The aluminoxanes that may be used include for example oligomeric linear, cyclic and/or cage-like alkyl aluminoxanes. Suitable aluminium-containing cocatalysts may for example be selected from methylaluminoxane, trimethylaluminium, triethylaluminium, triisopropylaluminium, tri-n-propylaluminium, triisobutylaluminium, tri-n-butylaluminium, tri-t-butylaluminium, triamylaluminium, dimethylaluminium ethoxide, diethylaluminium ethoxide, diisopropylaluminium ethoxide, di-n-propylaluminium ethoxide, diisobutylaluminium ethoxide, di-n-butylaluminium ethoxide, dimethylaluminium hydride, diethylaluminium hydride, diisopropylaluminium hydride, di-n-propylaluminium hydride, diisobutylaluminium hydride, and di-n-butylaluminium hydride.

Suitable boron-containing cocatalysts include for example triakylboranes, for example trimethylborane, triethylborane, and perfluoroarylborane compounds. For example, the cocatalyst may be methylaluminoxane.

The present invention in certain further embodiments also relates to a process for the preparation of olefin-based polymers. In particular, the invention relates to a process for preparation of olefin-based polymers comprising a step of polymerisation of at least one olefinic compound in the presence of the compound, the supported metallocene compound or the catalyst system comprising the compound or the supported metallocene compound.

The process for preparation of olefin-based polymers may for example be a gas-phase polymerisation process, a slurry polymerisation process, or a solution polymerisation process.

It is preferred that the olefinic compound(s) each is/are mono-olefinic compounds or di-olefinic compounds. For example, the olefinic compound(s) each is/are mono-olefinic α-olefins, preferably aliphatic α-olefins comprising 2-20 carbon atoms. It is particularly preferred that the olefinic compound(s) each is/are selected from ethylene, propylene, 1-butene, 1-pentene, 1-hexene, 4-methyl-1-pentene and 1-octene. For example, the olefinic compound(s) each is/are selected from ethylene, propylene, 1-butene, 1-hexene and 1-octene.

For example, the polymerisation may be a homopolymerisation of ethylene or propylene, or a copolymerisation of ethylene with one or more of propylene, 1-butene, 1-hexene, 4-methyl-1-pentene and 1-octene, or a copolymerisation of propylene with one or more of ethylene, 1-butene, 1-hexene, 4-methyl-1-pentene and 1-octene. It is particularly preferred that the polymerisation is a homopolymerisation of ethylene or a copolymerisation of ethylene with 1-butene, 1-hexene, 4-methyl-1-pentene or 1-octene.

In the process for preparation of olefin-based polymers, additional compounds may be used that enhance the production stability. Examples of such additional compounds are so-called scavenging agents that are used to remove impurities from the polymerisation system. Suitable scavenger compounds are well known in the art, like for example the main group metal alkyl compounds, like for instance aluminium alkyls, zinc alkyls or magnesium alkyls. Other compounds that may be used to enhance process stability are antistatic agents or anti-fouling agents. Suitable antistatic or anti-fouling agents can be amine compounds, reaction products of aluminium alkyl compounds with amine compounds or other commercially available antistatic or antifouling compounds that are well known in the art.

The invention also relates in a certain of its embodiments to an ethylene-based polymer produced using the catalyst system according to the invention. In particular, the ethylene-based polymer that is produced using the catalyst system according to the invention comprises at least 70.0 wt % of monomeric moieties derived from ethylene, more preferably at least 80.0 wt %, even more preferably at least 90.0 wt %, alternatively at least 70.0 wt % and at most 98.0 wt %, or at least 80.0 wt % and at most 95.0 wt %, with regard to the total weight of the ethylene-based polymer. Further particularly, such ethylene-based polymer may have a weight average molecular weight $M_w$ of $>10000$ g/mol. Further particularly, such ethylene-based polymer may have a molecular weight distribution $M_w/M_n$ of $\geq 2.0$. The weight average molecular weight $M_w$ and the number average molecular weight $M_n$ may be determined in accordance with ASTM D6474 (2012). In particular, the present invention also relates to an ethylene-based polymer produced using the catalyst system according to the invention, comprising at least 70.0 wt % of monomeric moieties derived from ethylene, having a weight average molecular weight $M_w$ of $>10000$ g/mol, and having a molecular weight distribution $M_w/M_n$ of $\geq 2.0$.

The ethylene-based polymer may for example be a linear low-density polyethylene, also referred to as LLDPE. Such LLDPE may for example have a density, as determined in accordance with ISO 1183-1 (2012), of $\geq 910$ and $\leq 940$ kg/m$^3$. Preferably, the LLDPE has a density of $\geq 912$ and $\leq 935$ kg/m$^3$, more preferably $\geq 912$ and $\leq 925$ kg/m$^3$. For example, the LLDPE may be an ethylene-based polymer comprising $\geq 1.0$ and $\leq 15.0$ wt %, or $\geq 2.0$ and $\leq 10.0$ wt %, or $\geq 2.0$ and $\leq 5.0$ wt %, of monomeric moieties derived from 1-butene, 1-hexene, 4-methyl-1-pentene or 1-octene, with regard to the total weight of the ethylene-based polymer. For example, the LLDPE may be an ethylene-based polymer comprising $\geq 1.0$ and $\leq 15.0$ wt %, or $\geq 2.0$ and $\leq 10.0$ wt %, or $\geq 2.0$ and $\leq 5.0$ wt %, of monomeric moieties derived from 1-butene, with regard to the total weight of the ethylene-based polymer. For example, the LLDPE may be an ethylene-based polymer comprising $\geq 1.0$ and $\leq 15.0$ wt %, or $\geq 2.0$ and $\leq 10.0$ wt %, or $\geq 2.0$ and $\leq 5.0$ wt %, of monomeric moieties derived from 1-hexene, with regard to the total weight of the ethylene-based polymer. For example, the LLDPE may be an ethylene-based polymer comprising $\geq 1.0$ and $\leq 15.0$ wt %, or $\geq 2.0$ and $\leq 10.0$ wt %, or $\geq 2.0$ and $\leq 5.0$ wt %, of monomeric moieties derived from 1-octene, with regard to the total weight of the ethylene-based polymer.

The LLDPE may for example have a melt mass-flow rate as determined in accordance with ASTM D1238 (2010) at 190° C., at a load of 2.16 kg ($MFI_{2.16}$), of $\geq 0.1$ and $\leq 125$ g/10 min. For example, the LLDPE may have an $MFI_{2.16}$ of $\geq 0.1$ and $\leq 50$ g/10 min, or $\geq 0.1$ and $\leq 10.0$ g/10 min, or $\geq 0.1$ and $\leq 5.0$ g/10 min.

Alternatively, the ethylene-based polymer may be a polyethylene plastomer or elastomer. For example, such polyethylene plastomer or elastomer may have density of $\geq 850$ kg/m$^3$ and $\leq 910$ kg/m$^3$, preferably $\geq 880$ and $\leq 905$ kg/m$^3$, more preferably $\geq 890$ and $\leq 905$ kg/m$^3$. Such polyethylene plastomer or elastomer may for example be an ethylene-based polymer comprising $\geq 10.0$ and $\leq 30.0$ wt %, preferably $\geq 10.0$ wt % and $\leq 20.0$ wt %, of monomeric moieties derived from 1-butene, 1-hexene, 4-methyl-1-pentene or 1-octene, with regard to the total weight of the ethylene-based polymer. For example, the polyethylene plastomer or elastomer may be an ethylene-based polymer comprising $\geq 10.0$ and $\leq 30.0$ wt %, preferably $\geq 10.0$ wt % and $\leq 20.0$ wt %, of monomeric moieties derived from 1-butene. For example, the polyethylene plastomer or elastomer may be an ethylene-based polymer comprising $\geq 10.0$ and $\leq 30.0$ wt %, preferably $\geq 10.0$ wt % and $\leq 20.0$ wt %, of monomeric moieties derived from 1-hexene. For example, the polyethylene plastomer or elastomer may be an ethylene-based polymer comprising $\geq 10.0$ and $\leq 30.0$ wt %, preferably $\geq 10.0$ wt % and $\leq 20.0$ wt %, of monomeric moieties derived from 1-octene.

The olefin-based polymers of the present invention may be mixed with suitable additives. Examples of suitable additives include antioxidants, nucleating agents, acid scavengers, processing aids, lubricants, surfactants, blowing agents, UV absorbers, quenchers, antistatic agents, slip agents, anti-blocking agents, anti-fogging agents, pigments, dyes, fillers, and curing agents such as peroxides. The additives may be mixed with the olefin-based polymers in typically effective amounts as known in the art, such as from 0.001 to 10.0 wt % with regard to the total weight of the composition of additives and the olefin-based polymer.

The olefin-based polymers of the invention and compositions comprising such may for example be used to manufacture articles. Particularly, such article may be a film. Such film may for example be produced via blown film extrusion or via cast film extrusion, as are known in the art. Such films may be multi-layer films or laminates. Typical uses of such films include use as shrink film, cling film, stretch film, sealing film, or oriented film. Further articles that may be manufactured using the olefin-based polymers of the invention include blow-moulding bottles, pipes, caps and closures.

The invention will now be illustrated by the following non-limiting examples.

Synthesis of Bisindenyl Compounds

A number of compounds were prepared to demonstrate the present invention. All experimental compounds comprised a 2,2'-biphenyl moiety as bridging group to connect two substituted or unsubstituted indenyl moieties.

Step X1: Synthesis of dibenzo[c,e][1,2,7]oxadiborepine-5,7-diol from 2,2'-dibromobiphenyl A white suspension of the Grignard reagent 4,4'-bis (bromomagnesium)biphenyl was obtained by addition of a solution of 62.4 g (200 mmol) of 2,2'-dibromobiphenyl in 900 ml tetrahydrofuran (THF) to 14.6 g (601 mmol, 3 molar equiv.) of magnesium turnings during 1.5 h followed by 3 h stirring at reflux. This suspension was cooled to −78° C., and then 52 g (500 mmol, 2.5 equiv.) of trimethylborate was added in one portion. The resulting heterogeneous mixture was stirred for 1 h at room temperature and then refluxed for 3 h. The boronic acid ester was hydrolyzed by careful addition of 1000 ml of 2M HCl at +5° C. followed by stirring for 1 h at room temperature (an excess of magnesium also disappeared), Further on, 600 ml of diethyl ether was added, the organic layer was separated, and the aqueous layer was additionally extracted with 2×500 ml of diethyl ether. The combined organic extract was evaporated to dryness, and the residue was dissolved in 1000 ml of diethyl ether. This solution was dried over $Na_2SO_4$ and then evaporate to dryness to give a yellowish oil including some crystalline material. The residue was dissolved in 50 ml of toluene, and then 800 ml on n-hexane was added. The resulting suspension was stirred for 20 min, the precipitate was filtered off using a G3 filter and then dried in vacuum. This procedure gave 22.8 (51%) of dibenzo[c,e][1,2,7]-oxadiborepine-5,7-diol, also referred to here as compound X1 (formula X1).

Formula X1

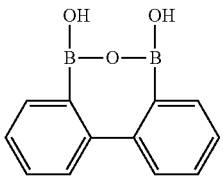

Experiment A1: Preparation of 6,6'-biphenyl-2,2'-diylbis-1,2,3,5-tetrahydro-s-indacene A compound according to the formula A1 herein below was prepared according to the following procedure.

Formula A1

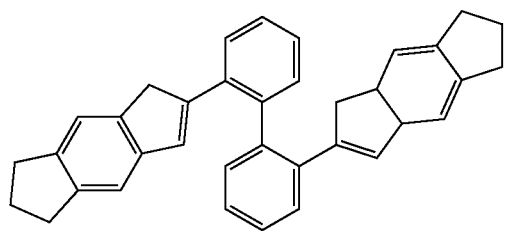

A1-a: Synthesis of 6-bromo-1,2,3,5-tetrahydro-s-indacene

To a solution of 86.1 g (500 mmol) of 3,5,6,7-tetrahydro-s-indacen-1(2H)-one in 650 ml of dichloromethane, 80.0 g (500.6 mmol) of bromine was added dropwise over 1 h. the resulting red solution was stirred overnight at room temperature. The volatiles were removed under vacuum, and the resulting red oily liquid was further used without additional purification.

To the solution of crude 2-bromo-3,5,6,7-tetrahydro-s-indacen-1(2H)-one in a mixture of 450 ml of THF and 250 ml of methanol, 20.0 g (528.7 mmol) of $NaBH_4$ was added portion wise for 3 h at 0-5° C. The obtained mixture was stirred overnight at room temperature and then evaporated to dryness. The residue was acidified by 2M HCl to pH 5-6, and the formed 2-bromo-1,2,3,5,6,7-hexahydro-s-indacen-1-ol was extracted with 3×300 ml of dichloromethane. The combined organic extract was dried over $Na_2SO_4$ and then evaporated to dryness. This product was further used without additional purification. To a solution of the thus obtained brown solid of crude 2-bromo-1,2,3,5,6,7-hexahydro-s-indacen-1-ol in 1300 ml of toluene, 15 g of p-toluene sulfonic acid (TSOH) was added, and the resulting solution was refluxed using a Dean-Stark head for 1 h. After cooling to room temperature, the reaction mixture was washed with 10% $Na_2CO_3$. The organic layer was separated, and the aqueous layer was additionally extracted with 2×100 ml of dichloromethane. The combined organic extract was evaporated to dryness to give a black solid, and the product was then isolated by flash chromatography on silica gel 60 (mean particle size 40-63 μm, eluent: hexane-dichloromethane, 10:1 by volume), followed by recrystallization from n-hexane. This procedure gave 49.64 g (42%) of 6-bromo-1,2,3,5-tetrahydro-s-indacene, also referred to here as compound A1-a.

A1-b: Synthesis of 6,6'-biphenyl-2,2'-diylbis-1,2,3, 5-tetrahydro-s-indacene

A mixture of 20.7 g (88.0 mmol) of compound A1-a, 9.67 g (43.2 mmol) of compound X1, 18.2 g (171.7 mmol) of $Na_2CO_3$, 2.7 g (2.34 mmol) of $Pd[PPh_3]_4$, 2.2 g (6.83 mmol) of $Bu_4NBr$, 100 ml of water and 250 ml of 1,2-dimethoxyethane was refluxed for 7 h. The main part of 1,2-dimethoxyethane was distilled off using a rotary evaporator. Further on, 300 ml of dichloromethane and 500 ml of water were added to the residue. The organic layer was separated, and the aqueous layer was additionally extracted with 100 ml of dichloromethane. The combined organic extract was evaporated to dryness to give a black solid. The product was isolated by flash chromatography on silica gel 60 (mean particle size 40-63 μm, dry loading method, eluent: hexane-dichloromethane, 10:1, then 5:1, by volume). This procedure gave 10.39 g (52%) of 6,6'-biphenyl-2,2'-diylbis-1,2,3,5-tetrahydro-s-indacene, also referred to as compound A1, as a white solid.

Experiment A2: Preparation of 2,2'-biphenyl-2,2'-diylbis(5,5,8,8-tetramethyl-5,6,7,8-tetrahydro-1H-cyclopenta[b]naphthalene)

A compound according to the formula A2 herein below was prepared according to the following procedure.

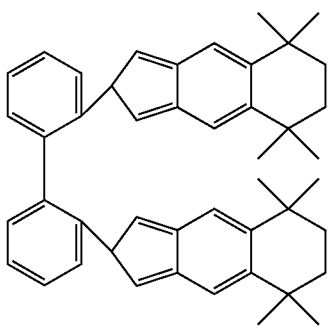

Formula A2

A2-a: Synthesis of 1,1,4,4,6-pentamethyl-1,2,3,4-tetrahydronaphthalene

To 1500 ml of 12 M HCl, 73.1 g (0.5 mol) of 2,5-dimethylhexane-2,5-diol was added portion wise. The obtained white suspension was stirred for 2 h at room temperature and then poured into 2000 ml of ice water. The resulting mixture was filtered off using a G3 filter and the collected precipitate was washed with water and then dissolved in 700 ml of dichloromethane. The organic layer was separated from the residual water and the dried over $Na_2SO_4$. To the obtained solution of 2,5-dichloro-2,5-dimethylhexane in dichloromethane, 150 (1.41 mol) of toluene was added, this mixture was stirred for 10 min, and then 5.00 g (0.037 mol) of $AlCl_3$ was added portion wise for 20 min. During this addition, a vigorous gas evolution was observed. The resulting mixture was stirred for 15 min and then quenched with 250 ml of cold water. The organic phase was separated and then filtered through a short layer of silica gel (40-63 μm). The elute was evaporated to dryness, and the residue was subjected to distillation to give 94.0 g (94%) of 1,1,4,4,6-pentamethyl-1,2,3,4-tetrahydronaphthalene, also referred to herein as compound A2-a, as a colourless oil which crystallises upon cooling.

A2-b: Synthesis of 6-(bromomethyl)-1,1,4,4-tetramethyl-1,2,3,4-tetrahydronaphthalene A mixture of 264.0 g (1.3 mol) of compound A2-a, 243.9 g (1.37 mol) of N-bromosuccinimide, and 1.0 g of azobisisobutyronitrile in 1000 ml of tetrachloromethane was refluxed for 4 h. Further on, this mixture was cooled to room temperature, the precipitated succinimide was filtered off with a G3 filter, and the filtrate was evaporated to dryness. The residue was distilled in vacuum to give 358.4 g of a product, further referred to as compound A2-b, comprising 79 wt % 6-(bromomethyl)-1,1,4,4-tetramethyl-1,2,3,4-tetrahydronaphthalene, which was further used without additional purification.

A2-c: Synthesis of 3-(5,5,8,8-tetramethyl-5,6,7,8-tetrahydronaphthalen-2-yl)propanoic acid To a solution of sodium ethoxide obtained from 35.2 g (1.53 mol) of sodium metal and 1000 ml of dry ethanol, 408 g (2.55 mol) of diethyl malonate was added. This mixture was stirred for 10 min, and then compound A2-b was added dropwise for 60 min. the resulting mixture was refluxed for 4 h, and then ethanol was distilled off. To the residue, 500 ml of water was added, and the obtained orange mixture was extracted with 3×300 ml of dichloromethane. The combined extract was dried over $Na_2SO_4$ and then evaporated to dryness. The crude product was distilled under reduced pressure to give 315 g (86%) of diethyl[(5,5,8,8-tetramethyl-5,6,7,8-tetrahydronaphthalen-2-yl)methyl]malonate as a colourless oil. To a rapidly stirred mixture thereof with 200 ml ethanol, a solution of 147 g (2.62 mol) of KOH in 200 ml water was added dropwise. The obtained mixture was refluxed for 4 h to saponificate the ester. Ethanol and water were distilled off until the distillation temperature reached 95° C., and then 2000 ml of water and 12 M HCl (to pH 1) were added to the residue. The formed substituted malonic acid was filtered off, washed with 1000 ml of water, and then decarboxylated at 180° C. This procedure gave 224 g (98%) of 3-(5,5,8,8-tetramethyl-5,6,7,8-tetrahydronaphthalen-2-yl)propanoic acid, herein also referred to as compound A2-c, as a brown oil which completely crystallised upon standing at room temperature.

A2-d: Synthesis of 5,5,8,8-tetramethyl-2,3,5,6,7,8-hexahydro-1H-cyclopenta[b]naphthalene-1-one A mixture of 224 g of compound A2-c and 190 ml (2.61 mol) of thionyl chloride was stirred for 24 h at room temperature. An excess of thionyl chloride was distilled off, and the residue was dried in vacuo. A solution of the thus obtained product in 200 ml of dichloromethane was added dropwise to a stirred suspension of 143 g (1.07 mol) of $AlCl_3$ in 900 ml of dichloromethane at 5° C. This mixture was stirred overnight at room temperature and then poured on 2000 g of crushed ice. The organic layer was separated, and the aqueous layer was extracted with 3×250 ml of dichloromethane. The combined organic extract was washed with aqueous $K_2CO_3$, dried over $K_2CO_3$, passed through a short pad of silica gel 60 (40-63 μm), and the obtained elute was evaporated to dryness. The residue was recrystallised from 1400 ml of ethanol to give 198 g (95%) of 5,5,8,8-tetramethyl-2,3,5,6,7,8-hexahydro-1H-cyclopenta[b]naphthalene-1-one, further also referred to as compound A2-d, as a white crystalline solid.

A2-e: Synthesis of 5,5,8,8-tetramethyl-5,6,7,8-tetrahydro-1H-cyclopenta[b]naphthalene To a solution of 139 g (0.57 mol) of compound A2-d in 600 ml of THF, 27.0 g (0.71 mol) of $NaBH_4$ was added in one portion. Further on, to this mixture, cooled to 0° C., 300 ml of methanol was added dropwise by vigorous stirring for 2 h. The resulting mixture was stirred overnight at room temperature and then evaporated to dryness. After that, 0.5 M HCl was added to the residue, and the obtained mixture was thoroughly shaken. Further on, the obtained mixture was extracted with 3×300 ml of dichloromethane. The combined organic extract was dried over $Na_2SO_4$ and then evaporated to dryness. The residue was dissolved in 200 ml of toluene, and the obtained solution was evaporated again. The obtained solution was refluxed with a Dean-Stark head for 10 min, cooled to room temperature, and then passed through a short layer of silica gel 60 (40-63 μm). The filtrate was evaporated to dryness, and the desired product was isolated from the residue by flash chromatography using 40 ml of the silica gel 60 and hexane as eluent to give 113.5 g (88%) of 5,5,8,8-tetramethyl-5,6,7,8-tetrahydro-1H-cyclopenta[b]naphthalene, herein also referred to as compound A2-e, as a white crystalline solid.

A2-f: Synthesis of 2-bromo-5,5,8,8-tetramethyl-2,3,5,6,7,8-hexahydro-1H-cyclopenta[b]naphthalene-1-ol To a solution of 113.5 g (0.5 mol) of compound A2-e in a mixture of 1000 ml of dimethylsulfoxide (DMSO) and 500 ml of THF 18 ml (1.0 mol) of water was added. Then, 93.8 g (0.53 mol) of N-bromosuccinimide was added portion wise for 30 min. After complete addition, the obtained mixture was stirred overnight at room temperature. Further on, 1000 ml of water and 1000 ml of ethyl acetate were added. The organic layer was separated, and the aqueous layer was additionally extracted with 3×150 ml of ethyl acetate. The combined organic extract was washed with 5×500 ml of water, dried over $Na_2SO_4$, and evaporated to dryness. The residue was washed with 300 ml of hexane on glass frit (G3), and the obtained solid was dried in vacuum. This procedure gave 155 g (95%) of 2-bromo-5,5,8,8-tetramethyl-2,3,5,6,7,8-hexahydro-1H-cyclopenta[b]naphthalene-1-ol, also referred to as compound A2-f, as a white powder.

A2-a: Synthesis of 3-(5,5,8,8-tetramethyl-5,6,7,8-tetrahydronaphthalen-2-yl)propanoic acid To a solution of 155 g (0.48 mol) of compound A2-f in 1000 ml of warm toluene 9.41 g (48 mmol) of TSOH was added. The resulting mixture was refluxed with a Dean-Stark trap for 10 min, cooled to room temperature, and then passed through a short pad of silica gel 60 (40-63 um). The filtrate was evaporated, and the residue was purified by flash chromatography on silica gel 60 (40-63 um, eluent: hexane) to give 113.5 g (85%) of 3-(5,5,8,8-tetramethyl-5,6,7,8-tetrahydronaphthalen-2-yl)propanoic acid, also referred to as compound A2-g, as a white crystalline solid.

A2-h: Synthesis of 5,5,8,8-tetramethyl-2,3,5,6,7,8-tetrahydro-1H-cyclopenta[b]naphthalene-1-one A mixture of 224 g of compound A2-g and 190 ml (2.61 mol) of thionyl chloride was stirred for 24 h at room temperature. An excess of thionyl chloride was distilled off, and the residue was dried in vacuo. A solution of thus obtained 3-(5,5,8,8-tetramethyl-5,6,7,8-tetrahydronaphthalen-2-yl)propanoyl chloride in 200 ml of dichloromethane was added dropwise to a stirred suspension of 143 g (1.07 mol) of $AlCl_3$ in 900 ml of dichloromethane at 5° C. This mixture was stirred overnight at room temperature and then poured on 2000 g of crushed ice. The organic layer was separated, and the aqueous layer was extracted with 3×250 ml of dichloromethane. The combined organic extract was washed by aqueous $K_2CO_3$, dried over $K_2CO_3$, passed through a short pad of silica gel 60 (40-63 um), and the obtained elute was evaporated to dryness. The residue was recrystallized from 1400 ml of ethanol to give 198 g (95%) of 5,5,8,8-tetramethyl-2,3,5,6,7,8-tetrahydro-1H-cyclopenta[b]naphthalene-1-one, also referred to as compound A2-h, as a white crystalline solid.

A2-i: Synthesis of 5,5,8,8-tetramethyl-5,6,7,8-tetrahydro-1H-cyclopenta[b]naphthalene To a solution of 139 g (0.57 mol) of compound A2-h in 600 ml of THF 27.0 g (0.71 mol) of $NaBH_4$ was added in one portion. Further on, to this mixture cooled to 0° C. 300 ml of methanol was added dropwise by vigorous stirring for 2 h. The resulting mixture was stirred overnight at room temperature and then evaporated to dryness. After that, 0.5 M HCl was added to the residue, and the obtained mixture was thoroughly shaken. Further on, the obtained mixture was extracted with 3×300 ml of dichloromethane. The combined organic extract was dried over $Na_2SO_4$ and then evaporated to dryness. The residue was dissolved in 200 ml of toluene, and the obtained solution was evaporated again. Finally, to the residue dissolved in 600 ml of toluene 0.6 g of TsOH was added. The obtained solution was refluxed with Dean-Stark trap for 10 min, cooled to room temperature, and then passed through a short layer of silica gel 60 (40-63 um). The filtrate was evaporated to dryness, and the desired product was isolated from the residue by flash chromatography using 400 ml of silica gel 60 (40-63 um) and hexane as eluent to give 113.5 g (88%) of 5,5,8,8-tetramethyl-5,6,7,8-tetrahydro-1H-cyclopenta[b]naphthalene, also referred to as compound A2-i, as a white crystalline solid.

A2-j: Synthesis of 2-bromo-5,5,8,8-tetramethyl-2,3,5,6,7,8-hexahydro-1H-cyclopenta[b]naphthalene-1-ol To a solution of 113.5 g (0.5 mol) of compound A2-i in a mixture of 1000 ml of DMSO and 500 ml of THF 18 ml (1.0 mol) of water was added. Then, 93.8 g (0.53 mol) of N-bromosuccinimide was added portionwise for 30 min. After complete addition, the obtained mixture was stirred overnight at room temperature. Further on, 1000 ml of water and 1000 ml of ethyl acetate were added. The organic layer was separated, and the aqueous layer was additionally extracted with 3×150 ml of ethyl acetate. The combined organic extract was washed with 5×500 ml of water, dried over $Na_2SO_4$, and evaporated to dryness. The residue was washed with 300 ml of hexane on glass frit (G3), and the obtained solid was dried in vacuum. This procedure gave 155 g (95%) of 2-bromo-5,5,8,8-tetramethyl-2,3,5,6,7,8-hexahydro-1H-cyclopenta[b]naphthalene-1-ol, also referred to as compound A2-j, as a white powder.

A2-k: Synthesis of 2-bromo-5,5,8,8-tetramethyl-5,6,7,8-tetrahydro-1H-cyclopenta[b]naphthalene To a solution of 155 g (0.48 mol) of compound A2-j in 1000 ml of warm toluene 9.41 g (48 mmol) of TsOH was added. The resulting mixture was refluxed with Dean-Stark trap for 10 min, cooled to room temperature, and then passed through a short pad of silica gel 60 (40-63 um). The filtrate was evaporated, and the residue was purified by flash chromatography on silica gel 60 (40-63 um, eluent: hexane) to give 113.5 g (85%) of 2-bromo-5,5,8,8-tetramethyl-5,6,7,8-tetrahydro-1H-cyclopenta[b]naphthalene, also referred to as compound A2-k, as a white crystalline solid.

A2-l: Synthesis of 2,2'-biphenyl-2,2'-diylbis(5,5,8,8-tetramethyl-5,6,7,8-tetrahydro-1H-cyclopenta[b]naphthalene)

A mixture of 30.5 g (100.0 mmol) of compound A2-k, 11.2 g (50.0 mmol) of compound X1, 26.0 g (245 mmol) of $Na_2CO_3$, 2.50 g (4.89 mmol) of $Pd(P^tBu_3)_2$, 125 ml of water, and 315 ml of 1,2-dimethoxyethane was refluxed for 7 h. After standing overnight at room temperature, the formed precipitate was filtered off, then dissolved in 400 ml of dichloromethane, and the resulting solution was washed with 150 ml of water. The organic layer was separated and the aqueous layer was additionally extracted with 100 ml of dichloromethane. The combined organic extract was evaporated to dryness to give a red mass. The product was isolated by flash-chromatography on silica gel 60 (40-63 um; eluent: dichloromethane/hexanes=5:1, vol.). This procedure gave 16.8 g (56%) of 2,2'-biphenyl-2,2'-diylbis(5,5,8,8-tetramethyl-5,6,7,8-tetrahydro-1H-cyclopenta[b]naphthalene), also referred to as compound A2, as a white crystalline material.

Experiment A3: Preparation of 6,6'-biphenyl(2,2'-dimethyl-1,2,3,5-tetrahydro-s-indacene)

A compound according to the formula A3 herein below was prepared according to the following procedure.

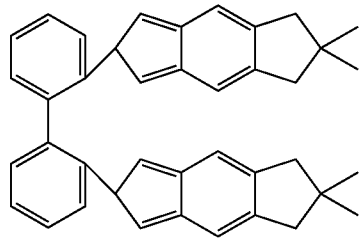

Formula A3

A3-a: Synthesis of 6,6-dimethyl-3,5,6,7-tetrahydro-s-indacen-1(2H)-one

To a stirred suspension of 82.5 g (0.62 mol) of AlCl$_3$ in 450 ml of dichloromethane a solution of 72.2 g (0.57 mol) of 3-chloropropanoyl chloride and 82.8 g (0.57 mol) of 2,2-dimethylindane in 150 ml of dichloromethane was added dropwise over 2 h at room temperature. This mixture was stirred for 2 h at room temperature and then poured on 1000 g of crushed ice. The organic layer was separated, and the aqueous layer was extracted with 2×200 ml of dichloromethane. The combined organic extract was washed by aqueous K$_2$CO$_3$, dried over K$_2$CO$_3$, passed through a short pad of silica gel 60 (40-63 um), and the obtained elute was evaporated to dryness to give crude 3-chloro-1-(2,2-dimethyl-2,3-dihydro-1H-inden-5-yl)propan-1-one as dark oily liquid. This liquid was added at room temperature to 1500 ml of 96% sulfuric acid. The resulting dark solution was heated for 40 min to 90° C. and additionally stirred for one hour at the same temperature. After cooling to room temperature the reaction mixture was poured on 3000 g of crushed ice, and 2000 ml of cold water was added. Then, 1000 ml of dichloromethane was added. The organic layer was separated, and the aqueous layer was extracted with dichloromethane (100 ml per 900 ml of the aqueous phase). The combined organic extract was washed by aqueous K$_2$CO$_3$, dried over K$_2$CO$_3$, and passed through a short pad of silica gel 60 (40-63 um). The elute was evaporated to dryness to give a slightly yellowish solid mass. Recrystallization of the later from 300 ml of n-hexane gave 57.8 g (51%) of 6,6-dimethyl-3,5,6,7-tetrahydro-s-indacen-1(2H)-one, also referred to as compound A3-a, as a white crystalline material.

A3-b: Synthesis of 2,2-dimethyl-1,2,3,5-tetrahydro-s-indacene

To a solution of 50.0 g (249.7 mmol) of compound A3-a in 250 ml of THF, cooled in an ice bath, 9.5 g (251.1 mmol) of NaBH$_4$ was added. Then, 125 ml of methanol was added dropwise for ca. 5 h at +5° C. This mixture was stirred overnight at room temperature and then evaporated to dryness. To the obtained white mass 500 ml of dichloromethane and 500 ml of water were added, and the resulting mixture was acidified by 2 M HCl to pH-4. The organic layer was separated, and the aqueous layer was extracted with 2×150 ml of dichloromethane. The combined organic extract was dried over Na$_2$SO$_4$ and then evaporated to dryness to give a white solid mass. To a solution of this mass in 750 ml of toluene 200 mg of TsOH was added. The resulting mixture was rapidly heated to reflux, refluxed with Dean-Stark head for 15 min, and then quickly cooled to room temperature using water bath. The resulting solution was washed by 10% K$_2$CO$_3$. The organic layer was separated, the aqueous layer was extracted with 2×100 ml of dichloromethane. The combined organic extract was dried over K$_2$CO$_3$ and then passed through a short pad of silica gel 60 (40-63 um). The silica gel layer was additionally washed by 100 ml of dichloromethane. The combined organic elute was evaporated to dryness to give a slightly yellowish liquid which was then distilled in vacuum to give 42.85 g (93%) of 2,2-dimethyl-1,2,3,5-tetrahydro-s-indacene, also referred to as compound A3-b, as a colorless liquid.

A3-c: Synthesis of 6-bromo-2,2-dimethyl-1,2,3,5-tetrahydro-s-indacene

To a stirred solution of 42.85 g (232.5 mmol) of 2,2-dimethyl-1,2,3,5-tetrahydro-s-indacene in a mixture of 300 ml of DMSO and 100 ml of THF 8.4 g (466.3 mmol) of water was added. To this mixture, cooled in an ice-bath, 43.44 g (244.1 mmol) of N-bromosuccinimide was added in small portions for 1.5 h, and the resulting mixture was stirred for 12 h. The obtained yellowish solution was poured into 1.2 liter of water, and this mixture was extracted with 3×300 ml of dichloromethane. The combined organic extract was washed with 5×1000 ml of water, dried over Na$_2$SO$_4$ and concentrated under reduced pressure to give 2-bromo-6,6-dimethyl-1,2,3,5,6,7-hexahydro-s-indacen-1-ol as a slightly yellowish powder. This compound was used further without an additional purification. To a solution of 2-bromo-6,6-dimethyl-1,2,3,5,6,7-hexahydro-s-indacen-1-ol in 650 ml of toluene 2.1 g of TsOH was added. Thus obtained mixture was refluxed with Dean-Stark head for 10 min, then rapidly cooled to room temperature using water bath. The resulting solution was washed by 10% Na$_2$CO$_3$. The organic layer was separated, the aqueous layer was extracted with 150 ml of toluene. The combined organic extract was dried over K$_2$CO$_3$ and evaporated to dryness to give yellowish solid mass. The product was isolated by flash-chromatography on silica gel 60 (40-63 um, eluent: hexanes) to give 57.9 g (95% for two stages from 2,2-dimethyl-1,2,3,5-tetrahydro-s-indacene) of 6-bromo-2,2-dimethyl-1,2,3,5-tetrahydro-s-indacene, also referred to as compound A3-c, as a white solid.

A3-d: Synthesis of 6,6'-biphenyl-2,2'-diylbis(2,2-dimethyl-1,2,3,5-tetrahydro-s-indacene)

A mixture of 23.15 g (88.0 mmol) of compound A3-c, 8.95 g (40.0 mmol) of compound X1, 18.5 g (174.6 mmol) of Na$_2$CO$_3$, 1.0 g (1.96 mmol) of Pd[P$^t$Bu$_3$]$_2$, 110 ml of water and 265 ml of 1,2-dimethoxyethane was refluxed for 7 h. Precipitation of the white powder was observed during reflux. Then, the reaction mixture was cooled, allowed to stand overnight at room temperature, and filtered through glass frit (G3). The filtrate was discarded. To the filter cake 300 ml of dichloromethane and 300 ml of water were added. The organic layer was separated, the aqueous layer was additionally extracted with 2×150 ml of dichloromethane. The combined organic extract was evaporated to dryness. The product was isolated by flash-chromatography on silica gel 60 (40-63 um; dry loading method; eluent: warm mixture of hexanes-dichloromethane=5:1, vol.). This procedure gave 13.48 g (65%) of 6,6'-biphenyl-2,2'-diylbis(2,2-dimethyl-1,2,3,5-tetrahydro-s-indacene), also referred to as compound A3, as a white solid.

Experiment A4: Preparation of 8,8'-biphenyl-2,2'-diylbis(2,2,5,5-tetramethyl-2,3,4,5,6,7-hexahydro-1H-cyclopenta[e]as-indacene)

A compound according to the formula A4 herein below was prepared according to the following procedure.

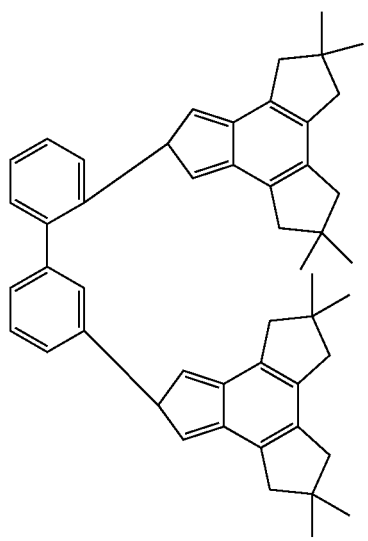

Formula A4

A4-a: Synthesis of 2,2,7,7-tetramethyl-1,6,7,8-tetrahydro-as-indacen-3(2H)-one

To a mixture of 169.64 g (791.6 mmol) of 2,7,7-trimethyl-1,6,7,8-tetrahydro-as-indacen-3(2H)-one and 135 g (951 mmol, 1.2 equiv.) of MeI cooled to 0° C., a solution of 124.4 g (1.11 mol, 1.4 eqv.) of t-BuOK in 1000 ml of THF was added dropwise over the course of 4 h, and the reaction mixture was stirred at room temperature for 4 h. The formed mixture was evaporated to dryness, 2000 ml of water was added to the residue, and the resulting mixture was extracted by 3×400 ml of dichloromethane. The combined organic extract was dried over $K_2CO_3$, passed through a short pad of silica gel 60 (40-63 um), and the filtrate was evaporated to dryness to give a reddish oil. This oil was distilled in vacuum to give 172.53 g (96%) of the compound A4-a as a slightly orange oil, which rapidly crystallized at room temperature.

A4-b: Synthesis of 2,2,7,7-tetramethyl-1,2,3,6,7,8-hexahydro-as-indacene

A mixture of 180 g (3.21 mol) of KOH, 172.59 g (755.9 mmol) of compound A4-a and 150 ml of hydrazine hydrate in 1250 ml of ethylene glycol was heated under reflux for 5.5 h. Then, the reflux condenser was replaced by a Claisen distillation head with condenser, and a mixture of $H_2O$, $NH_2NH_2$, compound A4-b, and ethylene glycol was distilled until the distillation temperature reached 201° C. Distillate was diluted with 1000 ml of water and then extracted by 800 ml of dichloromethane. The organic extract was washed with 2×1000 ml of water and then dried over $K_2CO_3$. Further on, the extract was evaporated to dryness to give a slightly yellowish oil. The product was isolated by flash-chromatography on silica gel 60 (40-63 um; 300 ml; eluent: hexanes), followed by crystallization from n-hexane. This procedure gave 144.81 g (89%) of compound A4-b as a white microcrystalline material.

A4-c: Synthesis of 5,5,8,8-tetramethyl-2,3,4,5,6,7,8,9-octahydro-1H-cyclopenta[e]as-indacen-1-one To a stirred suspension of 50.4 g (378 mmol, 1.26 eqv.) of $AlCl_3$ in 140 ml of dichloromethane, a solution of 40.0 g (315.04 mmol, 1.05 equiv.) of 3-chloropropanoyl chloride and 64.31 g (300 mmol) of compound A4-b in 140 ml of dichloromethane was added dropwise over 1.5 h at room temperature. This mixture was stirred additionally for 3 h at room temperature and then poured on 250 g of crushed ice. The organic layer was separated, and the aqueous layer was extracted with 2×150 ml of dichloromethane. The combined organic extract was washed by aqueous $K_2CO_3$, dried over $K_2CO_3$, passed through a short pad of silica gel 60 (40-63 um), and the filtrate was evaporated to dryness to give crude 3-chloro-1-(2,2,7,7-tetramethyl-1,2,3,6,7,8-hexahydro-as-indacen-4-yl)propan-1-one as white solid mass. Recrystallization of the later from 350 ml of n-hexane (hot→r.t.→0° C.) gave 84.3 g of pure 3-chloro-1-(2,2,7,7-tetramethyl-1,2,3,6,7,8-hexahydro-as-indacen-4-yl)propan-1-one as a white cottony material. The mother liquor was evaporated to dryness, and the brownish residue was recrystallized from 30 ml of n-hexane (hot→r.t.→0° C.) to give additional 3.67 g of the same compound. Thus, the total yield of 3-chloro-1-(2,2,7,7-tetramethyl-1,2,3,6,7,8-hexahydro-as-indacen-4-yl)propan-1-one isolated in this synthesis was 87.97 g (96%).

Further on, 87.97 g of 3-chloro-1-(2,2,7,7-tetramethyl-1,2,3,6,7,8-hexahydro-as-indacen-4-yl)propan-1-one (prepared above) was added to 300 ml of 96% sulfuric acid at room temperature. The obtained mixture was heated for 40 min to 90° C. (liberation of HCl became noticeable at 65° C.) and stirred additionally for one hour at the same temperature. After cooling to room temperature, the reaction mixture was poured on a mixture of 2000 g of crushed ice and 1000 ml of cold water. Then, 1.0 liter of dichloromethane was added. The organic layer was separated, and the aqueous layer was extracted with dichloromethane (100 ml per 900 ml of the aqueous phase). The combined organic extract was washed by cold water and aqueous $K_2CO_3$, dried over $K_2CO_3$, passed through a short pad of silica gel 60 (40-63 um). The elute was evaporated to dryness to give ca. 69 g of a slightly brownish solid mass. Recrystallization of the later from 450 ml of n-hexane gave 66.7 g (83%) of compound A4-c as a white microcrystalline material.

A4-d: Synthesis of 2,2,5,5-tetramethyl-2,3,4,5,6,7-hexahydro-1H-cyclopenta[e]as-indacene To a solution of 60.25 g (224.84 mmol) of compound A4-c in 500 ml of THF cooled to 5° C., 12.8 g (338.4 mmol) of $NaBH_4$ was added. Further on, 125 ml of methanol was added dropwise to this vigorously stirred mixture for ca. 5 h at 5° C. The resulting mixture was additionally stirred overnight at room temperature, then evaporated to dryness, and the residue was partitioned between 600 ml of dichloromethane and 600 ml of 1 M HCl. The organic layer was separated, and the aqueous layer was additionally extracted with 150 ml of dichloromethane. The combined organic extract was dried over Na₂SO₄ and then evaporated to dryness to give pink solid. To a solution of this solid in 500 ml of toluene 250 mg of TsOH was added, this mixture was refluxed with Dean-Stark head for 15 min and then cooled to room temperature using a water bath. The resulting solution was washed by 10% Na₂CO₃. The organic layer was separated, and the aqueous layer was extracted with 2×100 ml of dichloromethane. The combined organic extract was dried over K₂CO₃, evaporated to dryness, and the product was isolated by flash-chromatography on silica gel 60 (40-63 um; eluent: hexanes). This procedure gave 38.45 g (68%) of the compound A4-d as a white crystalline material.

A4-e: Synthesis of 8-bromo-2,2,5,5-tetramethyl-2,3,4,5,6,7-hexahydro-1H-cyclopenta[e]as-indacene To a stirred solution of 38.45 g (152.34 mmol) of compound A4-d in a mixture of 300 ml of DMSO and 200 ml of THF 10.0 ml (553.4 mmol) of water was added. To this mixture, cooled in an ice-bath, 27.5 g (154.5 mmol) of N-bromosuccinimide was added slowly in portions during 1.5 h, and the obtained suspension was stirred further for 12 h. The precipitate disappeared gradually to give a clear yellowish solution. This solution was poured into 1.2 liter of water, and the obtained mixture was extracted with 3×300 ml of dichloromethane. The combined organic extract was washed with 5×1000 ml of water, dried over Na₂SO₄ and then concentrated under reduced pressure. The residue thus obtained was triturated with 300 ml of n-hexane, the obtained suspension was filtered off (G3), and thus obtained precipitate was dried in vacuum to give 50.8 g (96%) of 2-bromo-5,5,8,8-tetramethyl-2,3,4,5,6,7,8,9-octahydro-1H-cyclopenta[e]as-indacen-1-ol as a white powder.

To a suspension of 50.8 g (145.4 mmol) of 2-bromo-5,5,8,8-tetramethyl-2,3,4,5,6,7,8,9-octahydro-1H-cyclopenta[e]as-indacen-1-ol (prepared above) in 550 ml of toluene 1.4 g of TosOH was added, and this mixture was refluxed with Dean-Stark head for 15 min. Then, the reaction mixture was rapidly cooled to room temperature using water bath. The resulting solution was diluted with 500 ml of toluene and washed by 10% Na₂CO₃. The organic layer was separated, the aqueous layer was extracted with 150 ml of toluene. The combined organic extract was dried over K₂CO₃, passed through a short pad of silica gel 60 (40-63 um) and evaporated to dryness to give yellowish solid mass. The latter was triturated with 200 ml of n-hexane, and thus obtained suspension was filtered off (G3) to give 44.76 g of compound A4-e as a white powder.

A4-f: Synthesis of 8,8'-biphenyl-2,2'-diylbis(2,2,5,5-tetramethyl-2,3,4,5,6,7-hexahydro-1H-cyclopenta[e]as-indacene)

A mixture of 29.2 g (88.1 mmol) of compound A4-e, 8.95 g (40.0 mmol) of dibenzo[c,e][1,2,7]-oxadiborepine-5,7-diol, 18.5 g (174.6 mmol) of Na₂CO₃, 2.0 g (3.91 mmol) of Pd[PtBu₃]₂, 110 ml of water and 265 ml of 1,2-dimethoxyethane was refluxed for 7 h.

Precipitation of the white powder was observed during this reflux. 700 ml of dichloromethane and 500 ml of water were added to the reaction mixture cooled to room temperature. The organic layer was separated, the aqueous layer was additionally extracted with 2×250 ml of dichloromethane. The combined organic extract was evaporated to dryness. The product was isolated by flash-chromatography on silica gel 60 (40-63 um; dry loading method; eluent: hexanes-dichloromethane=10:1, then 5:1, finally 1:1, vol.). This procedure gave 10.34 g (40%) of compound A4 as a white solid.

Experiment A5: Preparation of 2,2'-biphenyl-2,2'-diylbis-1H-cyclopenta[b]naphthalene A compound according to the formula A5 herein below was prepared according to the following procedure.

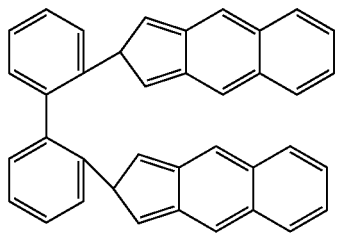

Formula A5

A mixture of 11.93 g (48.67 mmol) of 2-bromo-1H-cyclopenta[b]naphthalene, 4.6 g (20.55 mmol) of dibenzo[c,e][1,2,7]-oxadiborepine-5,7-diol, 9.4 g (88.7 mmol) of Na₂CO₃, 0.7 g (1.37 mmol) of Pd[PtBu₃]₂, 52 ml of water and 130 ml of 1,2-dimethoxyethane was refluxed for 7 h. Formation of white precipitate was observed during reflux. Then, the reaction mixture was cooled, allowed to stand overnight at room temperature and filtered through glass frit (G3). The filtrate was discarded. Further on, 2000 ml of dichloromethane and 500 ml of water were added to the filter cake. The organic layer was separated, dried over K₂CO₃ and evaporated to ca. 250 ml. White solid precipitated was filtered off (G3) and then dried in vacuum to give 5.05 g of 2,2'-biphenyl-2,2'-diylbis-1H-cyclopenta[b]naphthalene. The filtrate was evaporated to ca. 20 ml, Again, white solid precipitated was filtered off (G3) and then washed with 10 ml of dichloromethane. This procedure gave 0.67 g of 2,2'-biphenyl-2,2'-diylbis-1H-cyclopenta[b]naphthalene. Thus, the total yield compound A5 isolated in this reaction was 5.72 g (58%).

Experiment A6: Preparation of 2,2'-Bis(5,6-dimethyl-1H-inden-2-yl)biphenyl

A compound according to the formula A6 herein below was prepared according to the following procedure.

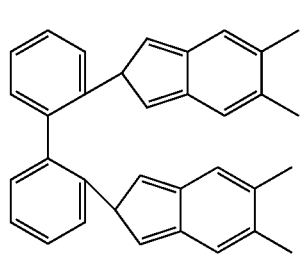

Formula A6

A6-a: Synthesis of 5,6-dimethyl-1H-indene

To a cooled to 5° C. solution of 40.9 g (255.3 mmol) of 5,6-dimethylindan-1-one in 260 ml of THF, 14.6 g (385.9 mmol) of NaBH₄ was added. Further on, 130 ml of methanol was added dropwise to this mixture for ca. 5 h at 5° C. The resulting mixture was evaporated to dryness, and the residue was partitioned between 600 ml of dichloromethane and 400 ml of 1 M hydrochloric acid. The organic layer was separated, the aqueous layer was additionally extracted with 100 ml of dichloromethane. The combined organic extract was evaporated to dryness to give a white solid. To a solution of this solid in 800 ml of toluene 250 mg of TsOH was added, this mixture was refluxed with Dean-Stark head for 10 min and then cooled to room temperature using water bath. The resulting solution was washed by 10% Na$_2$CO$_3$, the organic layer was separated, and the aqueous layer was extracted with 150 ml of dichloromethane. The combined organic extract was evaporated to dryness to give a solid mass. The product was isolated by flash-chromatography on silica gel 60 (40-63 um; eluent: hexane). This procedure gave 35.0 g (79%) of compound A6-a as a colorless solid.

A6-b: Synthesis of 2-bromo-5,6-dimethyl-1H-indene

To a stirred solution of 35.0 g (242.7 mmol) of 5 compound A6-a in 260 ml of DMSO 8.8 ml of water was added. To this mixture, cooled in an ice-bath, 45.3 g (254.5 mmol) of N-bromosuccinimide was added in small portions during 1 h, and the resulting solution was stirred for 12 h. The obtained yellowish solution was poured into 3.0 liter of water, and this mixture was extracted with 5×300 ml of dichloromethane. The combined organic extract was washed with 5×500 ml of water, dried over Na$_2$SO$_4$ and concentrated under reduced pressure. The residue thus obtained was triturated with 200 ml of n-hexane, the formed suspension was filtered through glass frit (G3), and thus obtained precipitate was dried in vacuum to give 51.2 g (88%) of 2-bromo-5,6-dimethylindan-1-ol as a white powder.

To a suspension of 51.2 g (212.3 mmol) of 2-bromo-5,6-dimethylindan-1-ol (prepared above) in 600 ml of toluene 2.0 g of TosOH was added, and this mixture was refluxed with Dean-Stark head for 15 min. Then, the reaction mixture was rapidly cooled to room temperature using water bath. The resulting solution was washed by 10% Na$_2$CO$_3$. The organic layer was separated, the aqueous layer was extracted with 300 ml of dichloromethane. The combined organic extract was dried over K$_2$CO$_3$ and evaporated to dryness to give yellowish solid mass. The product was isolated by flash-chromatography on silica gel 60 (40-63 um; eluent: hexanes-dichloromethane=10:1, vol.). This procedure gave 43.4 g (92% from 2-bromo-5,6-dimethylindan-1-ol or 80% for two stages from 5,6-dimethyl-1H-indene) of compound A6-b as a white solid.

A6-c: Synthesis of 2,2'-bis(5,6-dimethyl-1H-inden-2-yl)biphenyl

A mixture of 23.1 g (103.5 mmol) of compound A6-b, 9.2 g (41.1 mmol) of dibenzo[c,e][1,2,7]-oxadiborepine-5,7-diol, 17.3 g (163.2 mmol) of Na$_2$CO$_3$, 0.95 g (1.86 mmol) of Pd[PtBu$_3$]$_2$, 100 ml of water and 240 ml of 1,2-dimethoxyethane was refluxed for 7 h. The main part of 1,2-dimethoxyethane was distilled off on rotary evaporator. Further on, 500 ml of dichloromethane and 500 ml of water were added to the residue. The organic layer was separated, the aqueous layer was additionally extracted with 100 ml of dichloromethane. The combined organic extract was evaporated to dryness to give brown solid. The product was isolated by flash-chromatography on silica gel 60 (40-63 um, eluent: hexanes-dichloromethane=10:1, then 5:1, finally 3:1, vol.). This procedure gave 13.42 g (74%) of compound A6 as a white solid.

Experiment A7: Preparation of 6,6'-Biphenyl-2,2'-diylbis(4,8-dimethyl-1,2,3,5-tetrahydro-s-indacene)

A compound according to the formula A7 herein below was prepared according to the following procedure.

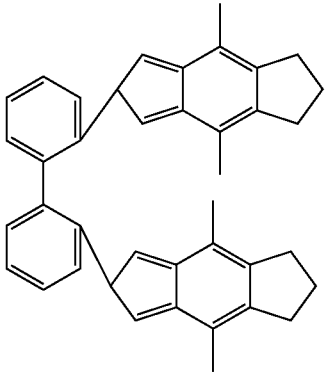

Formula A7

A7-a: Synthesis of 6-bromo-4,8-dimethyl-1,2,3,5-tetrahydro-s-indacene

To a stirred solution of 78.6 g (426.5 mmol) of 4,8-dimethyl-1,2,3,5-tetrahydro-s-indacene in a mixture of 850 ml of DMSO and 450 ml of THF 15.35 g (852.1 mmol) of water was added. Further on, 79.6 g (447.2 mmol) of N-bromosuccinimide was added slowly in small portions during 1 h at 0° C., and thus obtained mixture was stirred for 12 h. The resulting yellow solution was poured into 2.0 liter of water, and the formed mixture was extracted with 5×150 ml of dichloromethane. The combined organic extract was washed with 6×300 ml of water, dried over Na$_2$SO$_4$ and concentrated under a reduced pressure. The residue thus obtained was triturated with 300 ml of n-hexane. The formed precipitate was filtered off (G3) and dried to give 2-bromo-4,8-dimethyl-1,2,3,5,6,7-hexahydro-s-indacen-1-ol as a white powder. To a solution of this material in 1150 ml of toluene 3.9 g of TsOH was added, and the obtained mixture was refluxed with Dean-Stark head for 15 min. The resulting solution was rapidly cooled in a water bath and then washed by 10% Na$_2$CO$_3$. The organic layer was separated, the aqueous layer was extracted with 2×200 ml of toluene. The combined organic extract was dried over K$_2$CO$_3$, concentrated, and then purified by flash chromatography on silica gel 60 (40-63 um; eluent: hexanes-dichloromethane=10:1, vol.). This procedure gave 67.7 g (60% for two stages) of compound A7-a as a white solid.

A7-b: Synthesis of 6,6'-biphenyl-2,2'-diylbis(4,8-dimethyl-1,2,3,5-tetrahydro-s-indacene)

A mixture of 23.15 g (88.0 mmol) of compound A7-a, 8.95 g (40.0 mmol) of dibenzo[c,e][1,2,7]-oxadiborepine-5,7-diol, 18.5 g (174.6 mmol) of Na$_2$CO$_3$, 1.0 g (1.96 mmol) of Pd[PtBu$_3$]$_2$, 110 ml of water and 265 ml of 1,2-dimethoxyethane was refluxed for 7 h. The main part of 1,2-dimethoxyethane was distilled off on rotary evaporator.

Further on, 500 ml of dichloromethane and 1000 ml of water were added to the residue. The organic layer was separated, the aqueous layer was additionally extracted with 2×250 ml of dichloromethane.

The combined organic extract was evaporated to dryness. The product was isolated by flash-chromatography on silica gel 60 (40-63 um; dry loading method; eluent: hexanes-dichloromethane=10:1, then 5:1, finally 3:1, vol.). This procedure gave 5.02 g (24%) of compound A7 as a white solid.

Experiment A8: Preparation of 2,2'-bis(2-indenyl)biphenyl (comparative)

A compound according to the formula A8 herein below was prepared according to method as presented in Example VIII-VIII.3 of EP1059299A1.

Formula A8

Experiment A9: Preparation of 2,2'-bis(4,7-dimethyl-1H-inden-2-yl)biphenyl (Comparative)

A compound according to the formula A9 herein below was prepared according to method as presented in Example D of WO2016/188999A1.

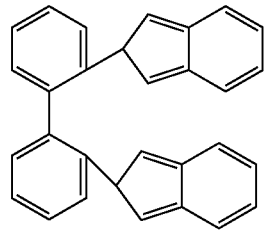

Formula A9

Synthesis of Metallocene Compounds

Experiment 1: Preparation of [6,6'-biphenyl-2,2'-diylbis(1,2,3,5-tetrahydro-s-indacenyl)]zirconium dichloride To a suspension of 4.63 g (10.01 mmol) of compound A1, cooled at −50° C., in 200 ml of ether, 8.01 ml (20.03 mmol) of 2.5M n-butyl lithium in hexane was added in one portion. This mixture was stirred overnight at room temperature. The resulting yellowish suspension was cooled to −50° C., and 2.34 g (10.04 mmol) of ZrCl$_4$ was added. The reaction mixture was stirred for 24 h resulting in a yellow solution with some heavy yellow precipitate. The resulting mixture was evaporated to dryness, and the residue was heated with 300 ml of toluene. This mixture was filtered while hot through a glass frit of type G4, and the obtained filtrate was evaporated to ca. 60 ml. After standing overnight at room temperature, the formed orange precipitate was filtered off using the G4 frit and discarded. The filtrate was evaporated to ca. 25 ml, and one drop of n-hexane was added. The yellow solid precipitated from this solution overnight at room temperature was collected and dried in vacuum. This procedure gave 4.3 g of [6,6'-biphenyl-2,2'-diylbis(1,2,3,5-tetrahydro-s-indacenyl)]zirconium dichloride, also referred to herein as compound B1 (Formula B1). The mother liquor was further evaporated to ca. 5 ml. Crystals precipitated from this solution were collected and dried in vacuum to give a further 1.01 g of compound B1, thus arriving at a total yield of 5.31 g (85%).

Formula B1

Experiment B2: Preparation of [2,2'-di-(5,5,8,8-tetramethyl-5,6,7,8-tetrahydro-1H-cyclopenta[b]naphthalene-2-yl)biphenyl]zirconium dichloride To a suspension of 7.54 g (12.5 mmol) of compound A2 in 200 ml of diethyl ether cooled to −60° C. 10.0 ml (25.0 mmol) of 2.5 M "BuLi in hexanes was added in one portion. This mixture was stirred overnight at room temperature. The resulting bright yellow solution with heavy bright yellow precipitate was cooled to −50° C., and then 2.92 g (12.5 mmol) of ZrCl$_4$ was added. The reaction mixture was stirred for 24 h resulting in yellow solution with a lot of yellow precipitate. This mixture was evaporated to dryness, and the residue was heated with 250 ml of toluene. The obtained hot mixture was filtered through glass frit (G4), the mother liquor was evaporated to ca. 120 ml and then heated to dissolve the formed precipitate. Yellow crystals precipitated from this solution overnight at room temperature were filtered off and then dried in vacuum. This procedure gave 8.52 g of [2,2'-di-(5,5,8,8-tetramethyl-5,6,7,8-tetrahydro-1H-cyclopenta[b]naphthalene-2-yl)biphenyl]zirconium dichloride, also referred to as compound B2 (Formula B2).

The mother liquor was evaporated to ca. 30 ml and then heated to dissolve the formed precipitate. Yellow crystals precipitated from this solution overnight at room temperature were filtered off and then dried in vacuum. This procedure gave a further 0.98 g of compound B2. Thus, the total yield of compound B2 isolated in this synthesis was 9.50 g (99%).

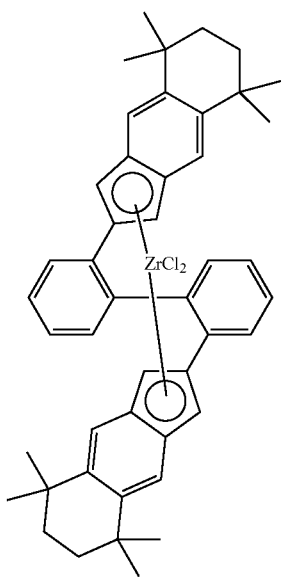

Formula B2

Experiment B3: Preparation of [6,6'-biphenyl-2,2'-diylbis(2,2'-dimethyl-1,2,3,5-tetrahydro-s-indacenyl)]zirconium dichloride To a cooled to −50° C. white suspension of 7.36 g (14.19 mmol) of compound A3 in 200 ml of ether 11.7 ml (28.43 mmol) of 2.43 M ⁿBuLi in hexanes was added in one portion. This mixture was stirred overnight at room temperature. The resulting yellow solution with yellow precipitate was cooled to −50° C., and 3.31 g (14.2 mmol) of ZrCl₄ was added. The reaction mixture was stirred for 24 h resulting in yellow solution with yellow precipitate. The obtained mixture was evaporated to dryness, and the residue was heated with 250 ml of toluene. This mixture was filtered while hot through glass frit (G4), and the filtrate was evaporated to ca. 40 ml. The yellow solid precipitated from this solution overnight at room temperature was collected and dried in vacuum. This procedure gave 7.48 g of [6,6'-biphenyl-2,2'-diylbis(2,2'-dimethyl-1,2,3,5-tetrahydro-s-indacenyl)]zirconium dichloride, also referred to as compound B3 (Formula B3). The mother liquor was further evaporated almost to dryness, and the residue was triturated with 10 ml of n-hexane. The precipitated yellow solid was filtered off (G4), washed with 5 ml of n-hexane and dried in vacuum giving additional 1.0 g of the compound B3. Thus, the total yield was 8.48 g (88%).

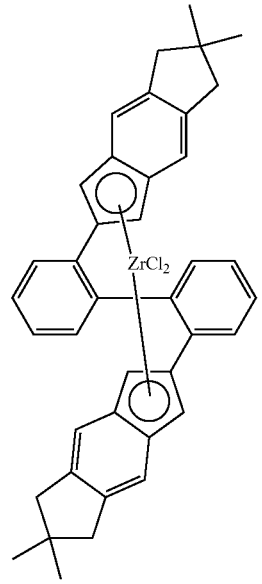

Formula B3

Experiment B4: Preparation of [6,6'-Biphenyl-2,2'-diylbis(η5-2,2,5,5-tetramethyl-2,3,4,5,6,7-hexahydro-1H-cyclopenta[e]as-indacenyl)]zirconium dichloride

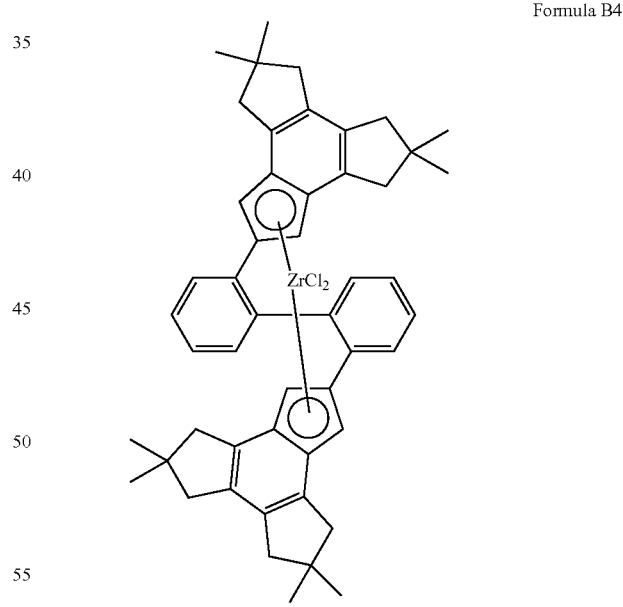

Formula B4

To a cooled to −50° C. white suspension of 6.30 g (9.62 mmol) of compound A4 in 200 ml of ether 7.92 ml (19.25 mmol) of 2.43 M nBuLi in hexanes was added in one portion. This mixture was stirred overnight at room temperature. The resulting slightly yellowish heterogeneous reaction mixture was cooled to −50° C., and 2.25 g (9.66 mmol) of ZrCl₄ was added. The reaction mixture was stirred for 24 h giving yellow solution with yellow precipitate.

The resulting mixture was evaporated to dryness, and the residue was heated with 450 ml of toluene. Thus obtained mixture was filtered while hot through glass frit (G4), and the filtrate was evaporated to ca. 250 ml. Yellow solid precipitated from this solution overnight at room temperature was collected and dried in vacuum. This procedure gave 6.7 g of [6,6'-biphenyl-2,2'-diylbis(η5-2,2,5,5-tetramethyl-2,3,4,5,6,7-hexahydro-1H-cyclopenta[e]as-indacenyl)]zirconium dichloride. The mother liquor was further evaporated to ca. 15 ml, and 5 ml of n-hexane was added. The precipitated yellow solid was filtered off (G4), washed with 5 ml of n-hexane, and dried in vacuum to give additional 0.9 g of the same zirconocene dichloride.

Thus, the total yield of compound B4 isolated in this synthesis was 7.6 g (97%).

Experiment E5: Preparation of [2,2'-biphenyl-2,2'-diylbis-η$^5$-cyclopenta[b]naphthalenyl]zirconium dimethyl

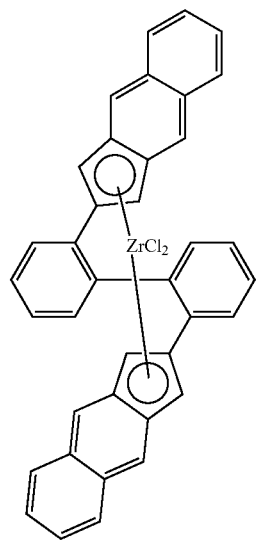

Formula B5

To a cooled to −50° C. white suspension of 4.95 g (10.26 mmol) of compound A5 in 250 ml of ether 8.2 ml (20.5 mmol) of 2.5 M "BuLi in hexane was added in one portion. This mixture was stirred overnight at room temperature. The resulting dark-red solution with some precipitate was cooled to −50° C., and 2.39 g (10.26 mmol) of ZrCl$_4$ was added. The reaction mixture was stirred for 48 h resulting in red solution with brownish orange precipitate. The resulting mixture was evaporated to dryness, and the residue was heated with 400 ml of toluene. This mixture was filtered while hot through glass frit (G4). The brownish solid precipitated from this solution overnight at room temperature was collected and then dried in vacuum. This procedure gave 0.75 g of [2,2'-biphenyl-2,2'-diylbis-η5-cyclopenta[b]naphthalenyl]zirconium dichloride, contaminated with ca. 15% of starting 2,2'-biphenyl-2,2'-diylbis-1H-cyclopenta[b]naphthalene. The separated toluene solution was used for the second hot extraction of the filter cake. The brownish solid precipitated from this solution overnight at room temperature was collected and dried in vacuum. This procedure gave 0.47 g of [2,2'-biphenyl-2,2'-diylbis-η5-cyclopenta[b]naphthalenyl]zirconium dichloride, contaminated with ca. 20% of starting 2,2'-biphenyl-2,2'-diylbis-1H-cyclopenta[b]naphthalene. The mother liquor was evaporated to ca. 15 ml, the precipitated brown solid was filtered off (G4) which was then dried in vacuum. This procedure gave 1.31 g of [2,2'-biphenyl-2,2'-diylbis-η5-cyclopenta[b]naphthalenyl] zirconium dichloride, that contained ca. 60% of starting 2,2'-biphenyl-2,2'-diylbis-1H-cyclopenta[b]naphthalene. To a solution of the first two isolated portions (total weight 1.22 g, ca. 1.9 mmol; contaminated with ca. 17% of starting pro-ligand) of crude [2,2'-biphenyl-2,2'-diylbis-η5-cyclopenta[b]naphthalenyl]zirconium dichloride in a mixture of 60 ml of toluene and 30 ml of ether 4.6 ml (9.71 mmol) of 2.11 M MeMgBr in ether was added. The resulting mixture was refluxed for 30 min. The reaction mixture was evaporated to ca. 50 ml under atmospheric pressure and then filtered while hot through glass frit (G4) to remove insoluble magnesium salts. The filter cake was washed additionally with 2×10 ml of hot toluene. The filtrate was evaporated to ca. 15 ml, heated and again filtered while hot through glass frit (G4). Light yellow crystals precipitated from this solution overnight at room temperature were collected and dried in vacuum. This procedure gave 0.81 g of pure compound B5. The mother liquor was evaporated to ca. 2 ml, and 5 ml of n-hexane was added. The precipitated light yellow solid was filtered off (G4) and then dried in vacuum. This procedure gave 0.12 g of title complex. Thus, the total yield of compound B5 in this synthesis was 0.93 g (15% from 2,2'-biphenyl-2,2'-diylbis-1H-cyclopenta[b]naphthalene).

Experiment B6: Preparation of [2,2'-Di-(η5-5,6-dimethyl-inden-2-yl)biphenyl]zirconium dichloride

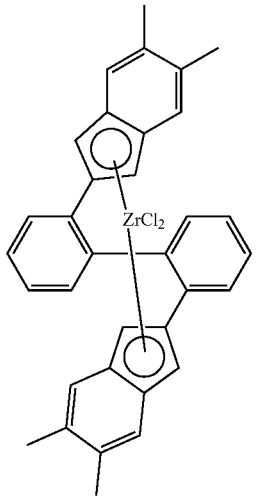

Formula B6

To a cooled to −50° C. white suspension of 4.33 g (9.87 mmol) of compound A6 in 200 ml of ether 8.1 ml (19.68 mmol) of 2.43 M nBuLi in hexanes was added in one portion. This mixture was stirred overnight at room temperature. The resulting light-yellow solution with a large amount of yellow precipitate was cooled to −60° C., and then 2.3 g (9.87 mmol) of ZrCl$_4$ was added. The reaction mixture was stirred overnight at room temperature resulting in yellow solution with a large amount of yellow precipitate. The obtained mixture was evaporated to dryness, and the residue was heated with 450 ml of toluene. This mixture was filtered while hot through glass frit (G4). Yellow crystalline solid precipitated from this solution 4 h at room temperature was collected, and the mother liquor was used for the second hot extraction of the filter cake. The latter procedure was repeated three times, then, the resulting filtrate was allowed to stand overnight at room temperature. Yellow crystals precipitated from the combined extract were collected and dried in vacuum. This procedure gave 5.01 g of the compound B6. The mother liquor was evaporated almost to dryness, the obtained residue was triturated with 30 ml of n-hexane. The precipitated yellow solid was filtered off (G4), washed with 5 ml of n-hexane, and then dried in vacuum to give additional 0.54 g of the same complex. Thus, the total yield of compound B6 isolated in this synthesis was 5.55 g (94%).

Experiment B7: Preparation of [6,6'-Biphenyl-2,2'-diylbis(η5-4,8-dimethyl-1,2,3,5-tetrahydro-s-indacenyl)]zirconium dichloride

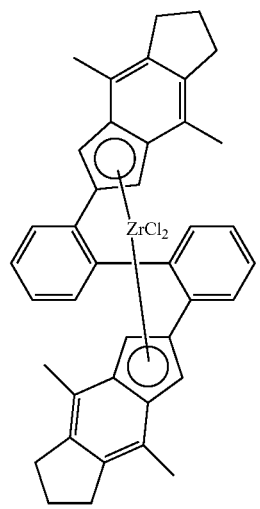

Formula B7

To a cooled to −50° C. suspension of 4.99 g (9.62 mmol) of compound A7 in 200 ml of ether 7.92 ml (19.25 mmol) of 2.43 M nBuLi in hexanes was added in one portion. This mixture was stirred overnight at room temperature. The resulting white suspension was cooled to −50° C., and then 2.25 g (9.66 mmol) of $ZrCl_4$ was added. The reaction mixture was stirred for 24 h resulting in yellow solution with a lot of heavy yellow precipitate. The resulting mixture was evaporated to dryness, and the residue was heated with 450 ml of toluene. This mixture was filtered while hot through glass frit (G4). Crystals precipitated from this filtrate overnight at room temperature were collected by decantation from the toluene solution. Thus separated toluene solution was further used for the second hot extraction of the filter cake. The combined yellow precipitate dried in vacuum. This procedure gave 4.3 g of the compound B7. The mother liquor was further evaporated to ca. 30 ml. Crystals precipitated from this solution were collected and dried in vacuum to give 1.5 g of compound B7. Thus, the total yield was 5.8 g (89%).

Experiment B8: Preparation of [2,2'-bis(2-indenyl)biphenyl]zirconium dichloride (comparative)

A compound according to the formula B8 herein below was prepared according to method as presented in Example VIII.4 of EP1059299A1.

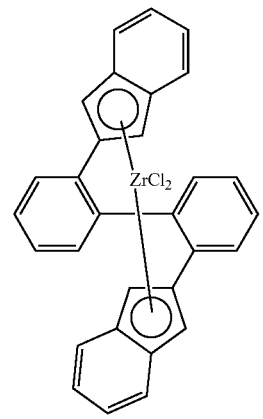

Formula B8

Experiment B9: Preparation of [2,2'-bis(4,7-dimethyl-1H-inden-2-yl)biphenyl]zirconium dichloride (comparative)

A compound according to the formula B9 herein below was prepared according to method as presented in Example D of WO2016/188999A1.

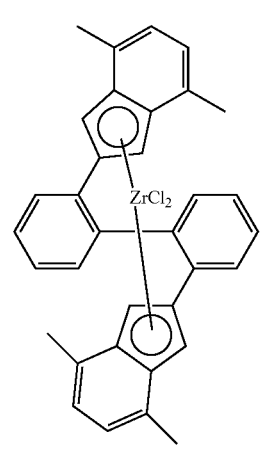

Formula B9

Preparation of Supported Metallocene Compounds

Based on compounds B2, B8 and B9, supported metallocene compounds were prepared. The supported compound of B8 is here referred to as C8. C8 was produced according to method as presented in Example VIII.6 of EP1059299A1. The supported compound of B9 is here referred to as C9. C9 was produced according to the method as presented in Example 2 of WO2016/188999A1.

Supported compound C2 was produced using compound B2. In a vial 0,244 mmol of B2 is suspended in 7.6 mL toluene and subsequently 7.6 mL MAO (30 wt %) is added. The suspension is stirred for 15 minutes at room temperature to give a clear solution. The solution is transferred to a round bottomed flask and the vial is washed with 2×4 mL toluene. 5 g ES7575 silica is added to the solution to form a slurry. The solvent is removed at room temperature by flushing the flask with nitrogen for 20 h to give a free flowing powder of supported compound C2. XRF analysis of C2 showed it to contain 36.8 wt % Si, 15.5 wt % Al, and 0.34 wt % Zr.

Polymerisation Experiments Using Unsupported Catalysts

The polymerisations were carried out in a PPR48 Parallel Pressure Reactor (PPR) for olefin polymerisation. This equipment, containing 48 reactors mounted in a triple glove-box, was sold commercially by the company Symyx, thereafter by the company Freeslate. The applied polymerisation protocols were as follows:

Prior to the execution of a library, the 48 PPR cells (reactors) undergo 'bake-and-purge' cycles overnight (8 h at 90-140° C. with intermittent dry N2 flow), to remove any contaminants and left-overs from previous experiments. After cooling to glove-box temperature, the stir tops are taken off, and the cells are fitted with disposable 10 mL glass inserts and PEEK stirring paddles (previously hot-dried under vacuum); the stir tops are then set back in place, the cells are loaded with the proper amounts of toluene (in the range 2.0-4.0 mL), 1-hexene (in the range 0.05-2.0 mL) and methylaluminoxane (MAO) solution (100 μL of 0.1 mol L-1 in toluene), thermostated at 80° C., and brought to the operating pressure of 65 psig with ethylene. At this point, the catalyst injection sequence is started; proper volumes of a toluene 'chaser', a solution of the precatalyst in toluene (typically in the range 0.005-0.05 mmol L-1), and a toluene 'buffer' are uptaken into the slurry needle, and then injected into the cell of destination. The reaction is left to proceed under stirring (800 rpm) at constant temperature and pressure with continuous feed of ethylene for 5-60 min, and quenched by over-pressurizing the cell with dry air (preferred to other possible catalyst poisons because in case of cell or quench line leaks oxygen is promptly detected by the dedicated glove-box sensor).

After quenching, the cells are cooled down and vented, the stir-tops are removed, and the glass inserts containing the reaction phase are taken out and transferred to a Genevac EZ2-Plus centrifugal evaporator, where all volatiles are distilled out and the polymers are thoroughly dried overnight. Reaction yields are double-checked against on-line monomer conversion measurements by robotically weighing the dry polymers in a Bohdan Balance Automator while still in the reaction vials (subtracting the pre-recorded tare). Polymer aliquots are then sampled out for the characterizations.

Polymerisation Experiments Using Supported Catalysts C2, C8 and C9

Ethylene Homopolymerization Procedure in Slurry

The polymerizations were carried out in a 5lbench scale batch reactor. The reactor operates under slurry conditions using isobutane as diluent. The 5 liter reactor is filled to 65% of its volume with diluent prior to each experiment. Statsafe was used as anti-fouling agent and TiBA was used as scavenger. The temperature of the reactor was kept as constant as possible by a thermostat bath. About 100 mg of the immobilised catalysts was then injected into the reactor, and constant ethylene pressure was maintained. After 1 hour of reaction time, the polymers were collected and dried in the vacuum oven (60° C., overnight) before the further analysis.

Ethylene/1-Hexene Copolymerization

Copolymerizations were also carried out in the same experimental set up used for homopolymerization. The same polymerization protocols were used except that specific amount of 1-hexene was fed into the reactor prior to the ethylene feed. After 1 hour of reaction time, the polymers were collected and dried in the vacuum oven (60° C., overnight) before the further analysis.

GPC Analysis

GPC curves are recorded with a Freeslate Rapid GPC setup, equipped with a set of 2 mixed-bed Agilent PLgel 10 μm columns and a Polymer Char IR4 detector. The upper deck of the setup features a sample dissolution station for up to 48 samples in 10 mL magnetically stirred glass vials, 4 thermostated bays each accommodating 48 polymer solutions in 10 mL glass vials, and a dual arm robot with two heated injection needles. With robotic operation, pre-weighed polymer amounts (typically 1-4 mg) are dissolved in proper volumes of orthodichlorobenzene (ODCB) containing 0.40 mg mL-1 of 4-methyl-2,6-di-tert-butylphenol (BHT) as a stabilizer, so as to obtain solutions at a concentration of 0.5 to 1.0 mg mL-1. After 2-4 h at 150° C. under gentle stirring to ensure complete dissolution, the samples are transferred to a thermostated bay at 145° C., and sequentially injected into the system at 145° C. and a flow rate of 1.0 mL min-1. In post-trigger delay operation mode, the analysis time is 12.5 min per sample. Calibration is carried out with the universal method, using 10 monodisperse polystyrene samples (Mn between 1.3 and 3700 KDa). Before and after each campaign, samples from a known i-PP batch produced with an ansa-zirconocene catalyst are analyzed for a consistency check. The weight average molecular weight ($M_w$) is expressed in kg/mol.

NMR Characterizations

13C NMR spectra are recorded with a Bruker Avance 400 III spectrometer equipped with a 5 mm High Temperature Cryoprobe, and a robotic sample changer with pre-heated carousel (24 positions). The samples (20-30 mg) are dissolved at 120° C. in tetrachloroethane-1,2-d2 (0.6 mL), added with 0.40 mg mL-1 of BHT as a stabilizer, and loaded in the carousel maintained at the same temperature. The spectra are taken sequentially with automated tuning, matching and shimming. Typical operating conditions for routine measurements are: 45° pulse; acquisition time, 2.7 s; relaxation delay, 5.0 s; 400-800 transients (corresponding to an analysis time of 30-60 min). Broad-band proton decoupling is achieved with a modified WALTZ16 sequence (BI_WALTZ16_32 by Bruker).

The catalyst activity is indicated by Rp, the calculated polymerisation rate, expressed as kilograms of copolymer, produced per mmol of catalyst per mol of ethylene in the reactor-diluent per hour.

The density of the polymers was determined according to the method of ISO 1183-1 (2012), using the conditioning method as described in ISO 1872-2 (2007), where the samples were annealed in boiling water for 30 min, and then left to cool for 16 hours in the same water in which they were annealed. Density is expressed in $g/cm^3$.

The weight average molecular weight $M_w$ and the number average molecular weight $M_n$ were determined in accordance with ASTM D6474 (2012), and expressed in kg/mol. The molecular weight distribution MWD is calculated as $M_w/M_n$.

The melt mass flow rate, also referred to as the melt index or MFI, of the polymers that were prepared was determined in accordance with ASTM D1238 (2010) at 190° C., at both a load of 2.16 kg ($MFI_{2.16}$) and 21.6 kg ($MFI_{21.6}$) and is expressed in g/10 min.

The hexene (C6) reactivity is expressed as mol percent hexene-incorporation in the copolymer (C6 inc., in mol %) per volume percent 1-hexene in the reaction diluent (C6 feed, in vol %). This reactivity is the averaged value of the polymerisation runs. Obviously, a higher hexene-incorporation per volume percent in the reaction-medium indicates a higher hexene reactivity.

People skilled in the art will recognize that when an alpha-olefin is incorporated in ethylene/alpha-olefin copolymerization, the molecular weight of the copolymer as well as the catalyst activity tend to be dependent on the amount of incorporated comonomer. In general, for instance, the molecular weight tends to decrease when the amount of incorporated comonomer increases. Therefore, when comparing molecular weights of copolymers obtained with different catalysts, the amount of incorporated comonomer has to be taken into account. This can, for instance, be done by performing at least two copolymerizations using different amounts of comonomer loading and fitting the correlation between $M_w$ and comonomer incorporation by a equation like for instance: $(1/M_w)=A+B\times(\text{mol \% comonomer in copolymer})$. By using the calculated parameters A and B, one can interpolate the $M_w$ of a copolymer at a different amount of comonomer incorporation. A similar approach can also be done for calculating the catalyst activity at a certain amount comonomer incorporation.

The experimental and analytical results from the polymerisations using unsupported metallocene compounds are presented in the tables 1-3 here below.

TABLE 1

Polymerisation results unsupported catalysts - homopolymerisation experiments

| Exp. | 1 | 2 | 3 | 4 | 5 | 6 | 7 (C) | 8 (C) |
|---|---|---|---|---|---|---|---|---|
| Cat | B1 | B2 | B3 | B4 | B5 | B6 | B8 | B9 |
| Rp | 1344 | 1322 | 939 | 1371 | 918 | 1180 | 724 | 898 |

The results of table 1 show that the compounds of the present invention, when used in unsupported catalysts for ethylene homopolymerisation, result in improved catalyst activity (Rp).

TABLE 2

Polymerisation results unsupported catalysts - copolymerisation experiments

| Exp. | Cat | C6 feed | Rp | $M_w$ | $M_n$ | MWD | C6 inc. |
|---|---|---|---|---|---|---|---|
| 9 | B1 | 10 | 502 | 617 | 158 | 3.9 | 0.7 |
| 10 | B1 | 40 | 164 | 304 | 101 | 3.0 | 2.5 |
| 11 | B2 | 10 | 1012 | 407 | 194 | 2.1 | 1.5 |
| 12 | B2 | 40 | 958 | 306 | 153 | 2.0 | 6.3 |
| 13 | B3 | 5 | 934 | 440 | 183 | 2.4 | 0.3 |
| 14 | B4 | 2 | 550 | 570 | 228 | 2.5 | 0.8 |
| 15 | B4 | 5 | 540 | 496 | 198 | 2.5 | 2.2 |
| 16 | B5 | 5 | 408 | 307 | 32 | 9.6 | 1.7 |
| 17 | B6 | 10 | 900 | 342 | 127 | 2.7 | 1.0 |
| 18 | B6 | 20 | 730 | 331 | 127 | 2.6 | 1.8 |
| 19 | B6 | 40 | 550 | 302 | 125 | 2.4 | 3.1 |
| 20 | B7 | 5 | 301 | 761 | 143 | 5.3 | 1.1 |
| 21 | B7 | 20 | 276 | 277 | 44 | 6.3 | 4.9 |
| 22(0) | B8 | 10 | 478 | 386 | 133 | 2.9 | 1.0 |
| 23(0) | B8 | 40 | 160 | 222 | 74 | 3.0 | 4.1 |
| 24(0) | B9 | 10 | 601 | 401 | 143 | 2.8 | 2.0 |
| 25(0) | B9 | 40 | 136 | 92 | 41 | 2.2 | 12.7 |

The results of table 2 show that the compound of the present invention, when used in unsupported catalysts for ethylene copolymerisation with 1-hexene, result in an improved balance of catalyst activity (Rp) combined with molecular weight ($M_w$).

TABLE 3

Polymerisation results unsupported catalysts - copolymerisation calculated for Rp and $M_w$ to 3 mol % 1-hexene incorporation

| Exp. | Cat | $M_w$ | C6 reactivity | Rp |
|---|---|---|---|---|
| 27 | B2 | 369 | 0.15 | 994 |
| 28 | B4 | 462 | 0.40 | 534 |
| 29 | B6 | 304 | 0.08 | 561 |
| 30 | B7 | 406 | 0.23 | 288 |
| 31 (C) | B8 | 261 | 0.10 | 209 |
| 32 (C) | B9 | 305 | 0.26 | 455 |

The experimental and analytical results from the polymerisations using supported metallocene compounds are presented in the tables 4-5 here below.

TABLE 4

Polymerisation results supported catalysts-ethylene homopolymerisation

| Exp. | Cat | Cat qty | PE yield | Cat yield | $MFI_{21.6}$ | $MFI_{21.6}$ | $M_w$ | $M_w/M_n$ | Density |
|---|---|---|---|---|---|---|---|---|---|
| 33 | C2 | 28 | 240 | 8571 | <0.1 | <0.1 | 390 | 3.8 | 943 |
| 34 (C) | C8 | 62 | 286 | 4613 | 0.4 | 6.9 | 170 | 3.3 | 949 |
| 35 (C) | C9 | 101 | 188 | 1861 | 0.1 | 2.4 | | | 951 |

TABLE 5

Polymerisation results supported catalysts-ethylene/1-hexene copolymerisation

| Exp. | Cat | Cat qty | PE yield | Cat yield | $MFI_{2.16}$ | $MFI_{21.6}$ | $M_w$ | $M_w/M_n$ | C6 inc. | Density |
|---|---|---|---|---|---|---|---|---|---|---|
| 36 | C2 | 24 | 477 | 19875 | <0.1 | <0.1 | 430 | 3.4 | 3.9 | 921 |
| 37 (C) | C8 | 62 | 689 | 11113 | 0.4 | 6.7 | 160 | 2.8 | 3.5 | 935 |
| 38 (C) | C9 | 101 | 307 | 3040 | 0.1 | 2.3 | | | | 934 |

Wherein:
Cat qty is the quantity of catalyst that was supplied to the reaction, in mg
PE yield is the quantity of polyethylene obtained from the reaction, in g
Cat yield is the quantity of polyethylene obtained per weight unit of catalyst supplied, in g polyethylene per g catalyst.

From tables 4 and 5, in becomes apparent that use of the compound of the present invention in supported catalyst systems allow for the polymerisation of ethylene, both in homopolymerisation and in copolymerisation, at high levels of yield of polymer per weight unit of catalyst, yielding a polymer having a desirably high molecular weight, and, in the copolymerisation reaction, a desirable comonomer build-in fraction.

The invention claimed is:

1. Compound according to formula I:

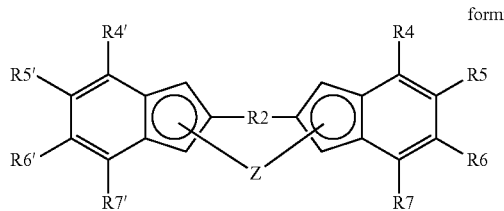

formula I wherein:
R2 is a bridging moiety containing at least one sp2 hybridised carbon atom; and
Z is a moiety selected from ZrX$_2$, HfX$_2$, or TiX$_2$, wherein X is selected from halogens, alkyls, aryls, or aralkyls, wherein condition (i) or condition (ii) applies:
(i) each of R4, R4', R7 and R7' is hydrogen or methyl, R4, R4', R7 and R7' are the same, R5 with R6 are connected to form a first fused moiety, R5' with R6' are connected to form a second fused moiety, the first fused moiety has the same structure as the second fused moiety, and the first fused moiety and the second fused moiety are selected from a benzene ring, a cyclohexane ring, or a cyclopentane ring, wherein the benzene ring, the cyclohexane ring, and the cyclopentane ring are optionally substituted with one or more methyl groups; or
(ii) R4 with R5, R4' with R5', R6 with R7, and R6' with R7' are connected to form fused moieties, the fused moieties of R4 with R5, R4' with R5', R6 with R7, and R6' with R7' are the same and are each a 5-carbon ring or a 6-carbon ring, wherein the 5-carbon ring and the 6-carbon ring are optionally substituted with one or more methyl groups.

2. Compound according to formula I:

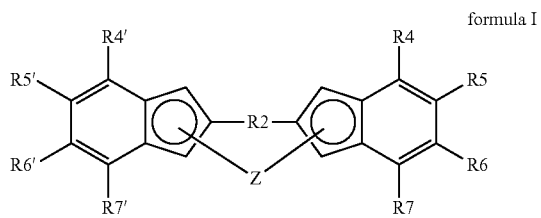

formula I wherein:
R2 is a bridging moiety containing at least one sp2 hybridised carbon atom;
R4, R4', R7 and R7' are hydrogen;
each of R5, R5', R6 and R6' is methyl; and
Z is a moiety selected from ZrX$_2$, HfX$_2$, or TiX$_2$, wherein X is selected from halogens, alkyls, aryls or aralkyls.

3. Compound according to claim 1, wherein each of the first fused moiety and the second fused moiety is a cyclohexane ring substituted with one or more methyl groups.

4. Compound according to claim 1, wherein R4, R4', R7 and R7' are hydrogen.

5. Catalyst system comprising the compound according to claim 1 and a cocatalyst selected from aluminium- or boron-containing cocatalysts.

6. Process for preparation of olefin-based polymers, comprising a step of polymerisation of at least one olefinic compound in the presence of the catalyst system according to claim 5.

7. Process according to claim 6, wherein the olefinic compound(s) each are mono-olefinic compounds or di-olefinic compounds.

8. Process according to claim 6, wherein the olefinic compound(s) each are α-olefins.

9. Process according to claim 6, wherein the olefinic compound(s) each are selected from ethylene, propylene, 1-butene, 1-pentene, 1-hexene, 4-methyl-1-pentene, or 1-octene.

10. Process according to claim 6, wherein the process is a copolymerisation process of ethylene and one or more comonomer selected from propylene, 1-butene, 1-pentene, 1-hexene, 4-methyl-1-pentene, or 1-octene.

11. Process according to claim 10, wherein the comonomer is selected from 1-butene, 1-hexene, or 1-octene.

12. Process according to claim 6, wherein the process is a gas-phase polymerisation process, a slurry polymerisation process, or a solution polymerisation process.

13. Compound according to claim 1, wherein
R2 is 2,2'-biphenylene; and
Z is a moiety selected from ZrX$_2$, HfX$_2$, or TiX$_2$, wherein X is a halogen or an alkyl group.

14. Compound according to claim 1, wherein the fused moieties of R4 with R5, R4' with R5', R6 with R7, and R6' with R7' are each a 5-carbon ring optionally substituted with one or two methyl groups.

15. Compound according to claim 1, wherein the compound is [6,6'-biphenyl-2,2'-diylbis(1,2,3,5-tetrahydro-s-indacenyl)]zirconium dichloride, [2,2'-di-(5,5,8,8-tetramethyl-5,6,7,8-tetrahydro-cyclopenta[b]naphthalene-2-yl) biphenyl]zirconium dichloride, [6,6'-biphenyl-2,2'-diylbis (2,2'-dimethyl-1,2,3,5-tetrahydro-s-indacenyl)]zirconium dichloride, [6,6'-biphenyl-2,2'-diylbis(η$^5$-2,2,5,5-tetramethyl-2,3,4,5,6,7-hexahydro-cyclopenta[e]as-indacenyl)]zirconium dichloride, [2,2'-biphenyl-2,2'-diylbis-η5-cyclopenta[b]naphthalenyl]zirconium dimethyl, or [6,6'-biphenyl-2,2'-diylbis(η$^5$-4,8-dimethyl-1,2,3,5-tetrahydro-s-indacenyl)]zirconium dichloride.

16. Compound according to claim 2, wherein R2 is 1,2-phenylene or 2,2'-biphenylene.

17. Compound according to claim 2, wherein the compound is [2,2'-di-(η$^5$-5,6-dimethyl-inden-2-yl)biphenyl]zirconium dichloride.

* * * * *